United States Patent
Inoue

(10) Patent No.: US 11,755,818 B2
(45) Date of Patent: Sep. 12, 2023

(54) COMPUTER-READABLE RECORDING MEDIUM STORING DESIGN DOCUMENT MANAGEMENT PROGRAM, DESIGN DOCUMENT MANAGEMENT METHOD, AND INFORMATION PROCESSING APPARATUS

(71) Applicant: FUJITSU LIMITED, Kawasaki (JP)

(72) Inventor: Shigenori Inoue, Nogoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/502,261

(22) Filed: Oct. 15, 2021

(65) Prior Publication Data

US 2022/0245325 A1    Aug. 4, 2022

(30) Foreign Application Priority Data

Jan. 29, 2021    (JP) ................. 2021-013912

(51) Int. Cl.
*G06F 40/137*    (2020.01)
*G06F 16/93*    (2019.01)
(Continued)

(52) U.S. Cl.
CPC ...... *G06F 40/137* (2020.01); *G06F 16/90344* (2019.01); *G06F 16/93* (2019.01); *G06F 40/177* (2020.01)

(58) Field of Classification Search
CPC .. G06F 40/137; G06F 16/90344; G06F 16/93; G06F 40/177
See application file for complete search history.

(56) References Cited

U.S. PATENT DOCUMENTS 6,298,357 B1 * 10/2001 Wexler .................. G06F 40/258
                                                        715/210
8,356,045 B2 *  1/2013 Chang .................. G06F 16/353
                                                        707/758

(Continued)

FOREIGN PATENT DOCUMENTS

JP    2015-162004 A    9/2015

OTHER PUBLICATIONS

Breitinger, Corinna; Gipp, Bela; Langer, Stefan (Jul. 26, 2015). "Research-paper recommender systems: a literature survey". International Journal on Digital Libraries. 17 (4): 305-338. doi:10.1007/s00799-015-0156-0. ISSN 1432-5012. S2CID 207035184. (Year: 2015).*

(Continued)

*Primary Examiner* — Benjamin Smith
(74) *Attorney, Agent, or Firm* — Fujitsu Patent Center

(57) ABSTRACT

A non-transitory computer-readable recording medium stores a design document management program causing a computer to execute a process including: acquiring a plurality of design documents about a system; identifying a plurality of label items representing elements of the system based on appearance frequency information of character strings included in the plurality of design documents acquired; and generating structure information in which the plurality of label items are hierarchized based on appearance positions at which the character string corresponding to each of the plurality of label items identified appears in the plurality of design documents.

10 Claims, 21 Drawing Sheets

(51) Int. Cl.
*G06F 16/903* (2019.01)
*G06F 40/177* (2020.01)

(56) References Cited

U.S. PATENT DOCUMENTS

| | | | | |
|---|---|---|---|---|
| 8,634,645 | B2* | 1/2014 | Xing | G06V 30/36 |
| | | | | 382/314 |
| 9,373,031 | B2* | 6/2016 | Ghessassi | G06F 16/93 |
| 9,817,814 | B2* | 11/2017 | Misra | G06F 16/3329 |
| 10,460,162 | B2* | 10/2019 | Gelosi | G06F 40/131 |
| 10,726,198 | B2* | 7/2020 | Gelosi | G06F 40/166 |
| 10,740,678 | B2* | 8/2020 | Ho | G06F 40/30 |
| 10,878,195 | B2* | 12/2020 | Duta | G06V 30/412 |
| 10,885,282 | B2* | 1/2021 | Ilić | G06F 40/211 |
| 2009/0245645 | A1* | 10/2009 | Xing | G06F 40/177 |
| | | | | 382/189 |
| 2011/0137900 | A1* | 6/2011 | Chang | G06F 40/186 |
| | | | | 707/E17.046 |
| 2017/0192958 | A1* | 7/2017 | Misra | G06F 40/30 |
| 2017/0286835 | A1* | 10/2017 | Ho | G06N 3/08 |
| 2017/0322921 | A1* | 11/2017 | Kyre | G06F 40/177 |
| 2018/0300315 | A1* | 10/2018 | Leal | G06F 16/355 |
| 2019/0114479 | A1* | 4/2019 | Gelosi | G06F 40/137 |
| 2019/0220503 | A1* | 7/2019 | Gelosi | G06F 40/131 |
| 2019/0278853 | A1* | 9/2019 | Chen | G06F 16/211 |
| 2019/0340240 | A1* | 11/2019 | Duta | G06V 30/15 |
| 2020/0184013 | A1* | 6/2020 | Ilic | G06F 40/258 |
| 2021/0173844 | A1* | 6/2021 | Kobayashi | G06N 5/022 |
| 2021/0174078 | A1* | 6/2021 | Harada | G06V 30/418 |
| 2021/0294974 | A1* | 9/2021 | Gao | G06F 40/166 |
| 2021/0319173 | A1* | 10/2021 | Gerber, Jr. | G06F 40/143 |
| 2021/0319177 | A1* | 10/2021 | Pito | G06F 40/284 |
| 2021/0319180 | A1* | 10/2021 | Gao | G06F 40/166 |
| 2021/0319356 | A1* | 10/2021 | Wang | G06F 40/177 |
| 2021/0350080 | A1* | 11/2021 | Gao | G06F 40/284 |
| 2021/0390298 | A1* | 12/2021 | Pito | G06F 40/242 |

OTHER PUBLICATIONS

Wikipedia, tf-idf term frequency-inverse document frequency, Jun. 11, 2018, 8 pages; https://en.wikipedia.org/wiki/Tf%E2%80%93idf; https://web.archive.org/web/20180611015803/https://en.wikipedia.org/wiki/Tf%E2%80%93idf (Year: 2018).*

Ann Sebastian, A Gentle Introduction to Calculating the TF-IDF Values; Jul. 16, 2020, 16 pages; https://towardsdatascience.com/a-gentle-introduction-to-calculating-the-tf-idf-values-9e391f8a13e5 (Year: 2020).*

Wikipedia, Latent Dirichlet allocation, Jun. 14, 2020, 8 pages, https://en.wikipedia.org/wiki/Latent_Dirichlet_allocation, https://web.archive.org/web/20200614184102/https://en.wikipedia.org/wiki/Latent_Dirichlet_allocation (Year: 2020).*

* cited by examiner

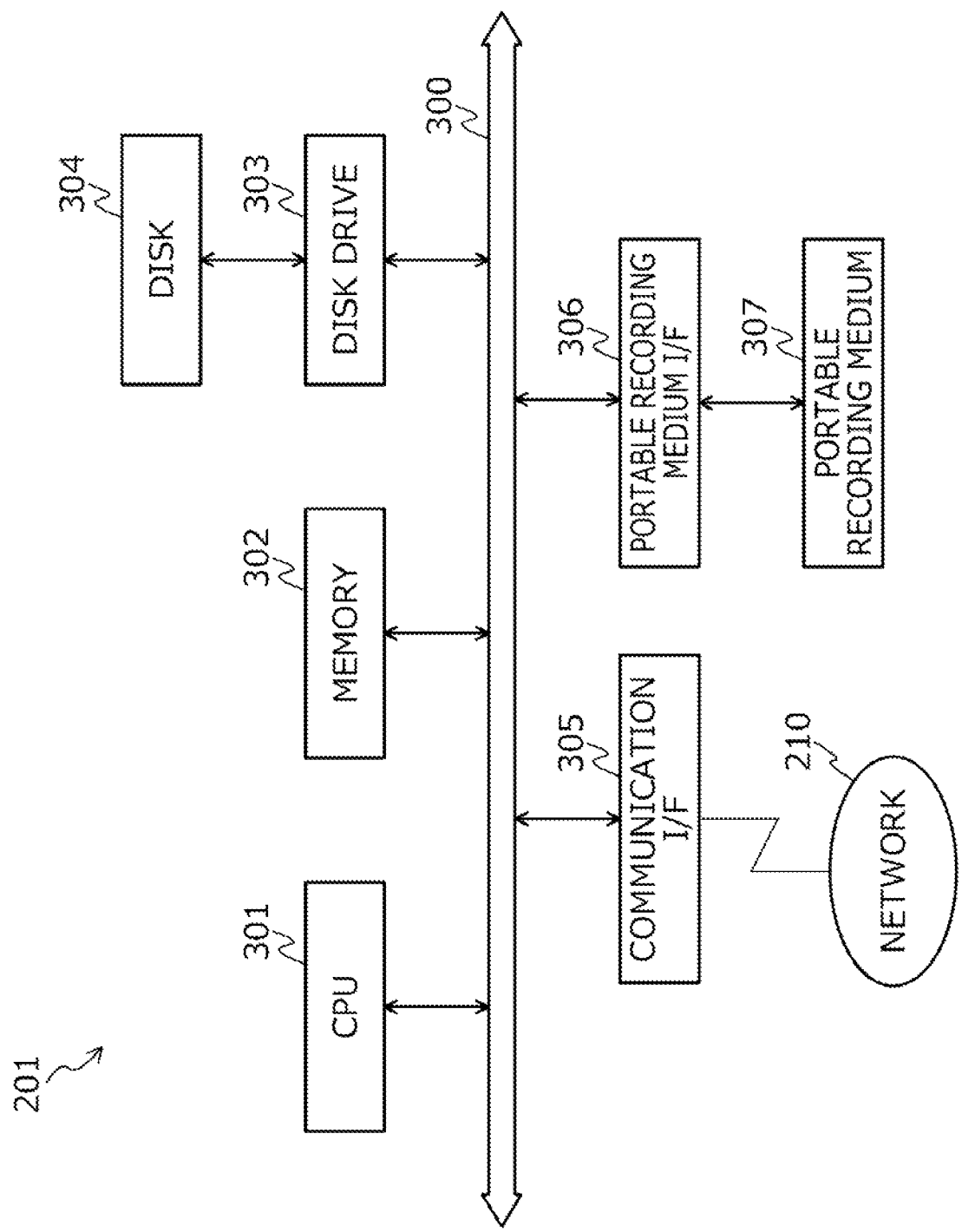

FIG. 4B

| SHEET NAME | | EVENT PROCESS_PRESS "BACK" BUTTON | | CREATION DATE | 8/1/2019 | LAST UPDATE DATE | |
|---|---|---|---|---|---|---|---|
| | | | | CREATOR | ○○○ | LAST UPDATING PERSON | |
| SERIES NAME | X | SYSTEM NAME | Y | ;YY | | SUBSYSTEM NAME | Z | ;ZZ |
| FUNCTIONAL BLOCK ID | 0 | FUNCTIONAL BLOCK NAME | 'HOGE | | | | |
| SCREEN ID | IMAGE | SCREEN NAME | 'IMAGE | | | | |
| EVENT ID | EV_BACK_BTN | EVENT NAME | PRESS BACK BUTTON | | | | |
| INPUT SOURCE | PROCESSING DETAILS | | | | | OUTPUT/CALL DESTINATION | |
| 1.PREPROCESS | NOTHING | | | | | | |
| SESSION: SCREEN DATA | | | | | | SESSION: SCREEN DATA | |
| 2.MAIN PROCESS | 2-1.CLOSE OPENED SCREEN | | | | | | |
| 3.SCREEN EDITING | NOTHING | | | | | | |

| SHEET NAME | | CREATION DATE | 8/1/2019 | LAST UPDATE DATE | |
|---|---|---|---|---|---|
| EVENT PROCESS_PRESS "SEARCH" BUTTON | | CREATOR | Y:YY | LAST UPDATING PERSON | |

| SERIES NAME | X | SYSTEM NAME | | SUBSYSTEM NAME | Z |
|---|---|---|---|---|---|
| FUNCTIONAL BLOCK ID | 0 | FUNCTIONAL BLOCK NAME | HOGE | | |
| SCREEN ID | IMAGE | SCREEN NAME | IMAGE | | |
| EVENT ID | EVT_SRC_BTN | EVENT NAME | PRESS "SEARCH" BUTTON | | |

PROCESSING DETAILS

INPUT SOURCE
1. PREPROCESS

SCREEN:
X LIST SCREEN 1-1. CHECK INPUT
PERFORM FOLLOWING INPUT CHECK AND PERFORM SUBSEQUENT PROCESSES ONLY WHEN THERE IS NO ERROR.

| # | ITEM NAME (SCREEN) | CHECK DETAILS | | | | | REMARKS |
|---|---|---|---|---|---|---|---|
| | | INFRASTRUCTURE | REQUESTED | NUMBER OF DIGITS | FORMAT | CORRELATION | OTHER |
| 1 | REQUEST SOURCE X | ● | ● | | | | |
| 2 | START NUMBER | ● | | | | (1) | |
| 3 | END NUMBER | ● | | | | (1) | |
| 4 | REASON FOR CLASSIFICATION | ● | | | | | |
| 5 | SCHEDULED START DATE | ● | | | ● | (2) | *(3) |
| 6 | SCHEDULED END DATE | ● | | | ● | (2) | OTHER: USER AUTHORI |
| 7 | START OF WORK PROGRESS | ● | | =5 | | | FORMAT: YYYY/MM/DD |
| 8 | END OF WORK PROGRESS | ● | | =5 | | | FORMAT: DATE VALIDI |

2. MAIN PROCESS

SCREEN:

2-1. ACQUIRE REQUEST INFORMATION

403

FIG. 5

EXTRACTED CHARACTER STRING TABLE ~230

| CHARACTER STRING/ COMBINED CHARACTER STRING | APPEARANCE POSITION | GROUP |
|---|---|---|
| SHEET NAME | (A, 1, d1), (A, 1, d2), (A, 1, d3), (A, 1, d4) | g1 |
| CREATION DATE | (S, 1, d1), (S, 1, d2), (S, 1, d3), (S, 1, d4) | g2 |
| ... | ... | ... |
| CLEAR BUTTON | (M, 53, d1) | g10 |
| ... | ... | ... |
| SHEET NAME & CREATION DATE | (A, 1, d1), (A, 1, d2), (A, 1, d3), (A, 1, d4) | g1 & g2 |
| ... | ... | ... |

APPEARANCE FREQUENCY INFORMATION TABLE ~240

| | d1 | d2 | d3 | d4 | EVALUATION VALUE |
|---|---|---|---|---|---|
| g1 | 1/119 | 1/42 | 1/140 | 1/57 | V(g1) |
| g2 | ... | ... | ... | ... | ... |
| ... | ... | ... | ... | ... | ... |
| g1 & g2 | ... | ... | ... | ... | V(g1 & g2) |
| ... | ... | ... | ... | ... | ... |

| # | ITEM NAME (SCREEN) | SET VALUE (OUTPUT MESSAGE/ FIXED VALUE) | ATTRIBUTE CONTROL |
|---|---|---|---|
| 1 | REQUEST SOURCE X | | ACTIVE |
| 2 | START NUMBER | BLANK | ACTIVE |
| 3 | END NUMBER | BLANK | ACTIVE |
| 4 | REASON FOR CLASSIFICATION | | ACTIVE |
| 5 | REASON FOR CLASSIFICATION | BLANK | ACTIVE |
| 6 | SCHEDULED END DATE | BLANK | ACTIVE |
| 7 | START OF WORK PROGRESS | | ACTIVE |
| 8 | END OF WORK PROGRESS | | ACTIVE |
| 9 | SEARCH BUTTON | - | ACTIVE |
| 10 | CLEAR BUTTON | - | ACTIVE |
| 11 | PAGER | FIRST PAGE | ACTIVE |
| 12 | SEARCH RESULT LIST | DISPLAY ONLY HEADER (0 DETAILS) | - |

(K,43) — 1001, 1002, 1003, ......, 1013

LABEL ITEM; PECULIAR INFORMATION

COMPUTER-READABLE RECORDING MEDIUM STORING DESIGN DOCUMENT MANAGEMENT PROGRAM, DESIGN DOCUMENT MANAGEMENT METHOD, AND INFORMATION PROCESSING APPARATUS

CROSS-REFERENCE TO RELATED APPLICATION

This application is based upon and claims the benefit of priority of the prior Japanese Patent Application No. 2021-13912, filed on Jan. 29, 2021, the entire contents of which are incorporated herein by reference.

FIELD

The embodiments discussed herein are related to a computer-readable recording medium storing a design document management program, a design document management method, and an information processing apparatus.

BACKGROUND

In recent years, a system development method in a form called DevOps has become widespread. DevOps is a methodology that combines cycles of development (Dev) and operations (Ops) together, thereby enabling rapid development and introduction of software and frequent improvement and update of the software. The form of DevOps employs an agile method and tends to modify a system with high frequency.

Japanese Laid-open Patent Publication No. 2015-162004 is disclosed as related art.

SUMMARY

According to an aspect of the embodiments, a non-transitory computer-readable recording medium stores a design document management program causing a computer to execute a process including: acquiring a plurality of design documents about a system; identifying a plurality of label items representing elements of the system based on appearance frequency information of character strings included in the plurality of design documents acquired; and generating structure information in which the plurality of label items are hierarchized based on appearance positions at which the character string corresponding to each of the plurality of label items identified appears in the plurality of design documents.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating a hardware configuration example of a design document management server;

FIG. 4B is an explanatory diagram illustrating the specific example of a design document (part 2);

FIG. 4C is an explanatory diagram illustrating a specific example of a design document (part 3);

FIG. 5 is an explanatory diagram illustrating an example of contents stored in an extracted character string table;

FIG. 6 is an explanatory diagram illustrating an example of contents stored in an appearance frequency information table;

FIG. 10 is an explanatory diagram illustrating an example of acquisition of information peculiar to a first label item;

DESCRIPTION OF EMBODIMENTS

For example, a document tree that is a hierarchical tree structure of nodes as document units is constructed, link destination candidates matching a keyword string composed of multiple keywords designated are searched out from the keyword string based on the hierarchical structure of the document tree, and the searched-out link destination candidates are displayed.

For example, however, it is difficult to obtain information expressing a structure of a system such as a create, read, update, and delete (CRUD) diagram (information analysis diagram), a data flow diagram (DFD), or a function list from multiple design documents (for example, functional design documents) about the system. For example, every time a system is modified, it is difficult to manually check the multiple functional design documents and reflect the modification to the CRUD diagram, the DFD, or the like.

In one aspect, an object of the present disclosure is to generate information expressing a structure of a system from multiple design documents.

Hereinafter, the embodiments of a design document management program, a design document management method, and an information processing apparatus according to the present disclosure will be described in detail with reference to the drawings.

EMBODIMENTS

Figure 1:
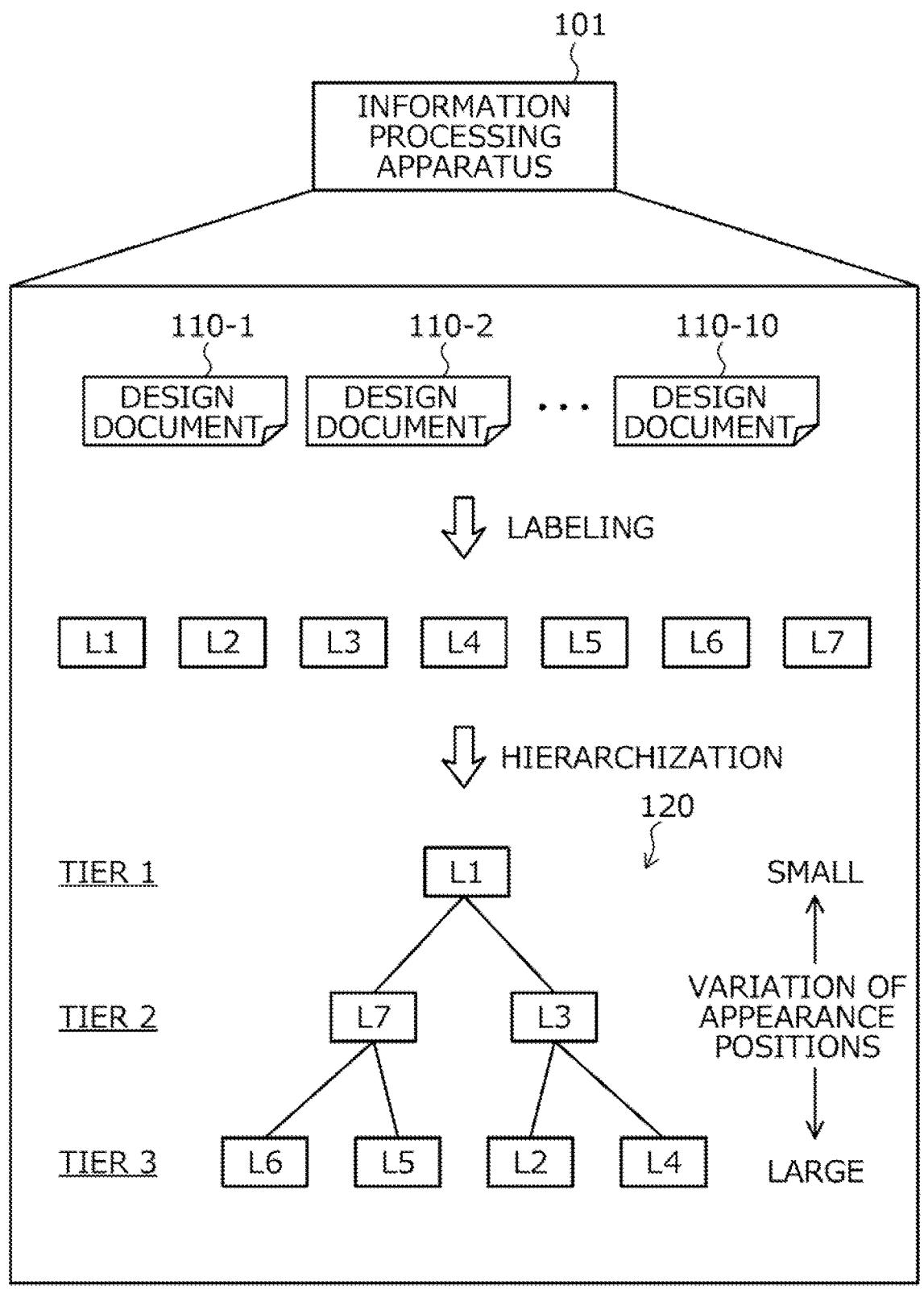
FIG. 1 is an explanatory diagram illustrating an example of a design document management method according to an embodiment.

FIG. 1 is an explanatory diagram illustrating an example of a design document management method according to an embodiment. In FIG. 1, an information processing apparatus 101 is a computer that generates structure information of a system based on multiple design documents about the system. The system is a computer system that provides various kinds of information processing (services), and is, for example, a business system.

The design document is a document used for system development, and is information to be referred to by humans (such as developers, programmers, operators, and maintenance staff). The design document is, for example, a functional design document created for each function. The functional design document provides information that describes what process implements each of functions of the system. Examples of the functional design documents include a screen layout design document, a continuous form process design document, a batch process design document, and so on. In the system development, source code to implement each function is created based on such a design document.

The system development may also use an overall design document in addition to single-function design documents such as a screen layout design document and a continuous form process design document. The overall design document provides information expressing the structure of the system, and provides, for example, information that describes specifications to be standardized throughout the entire system and so forth. Examples of the overall design documents include a CRUD diagram, a data flow diagram (DFD), a function list, and so on. The overall design document is created, for example, for the purpose of making it possible to know the entire structure of the system and improving ease of maintenance and operations.

With the recent spread of the DevOps form, the system development may focus on working code such as source code and neglect to update documents such as design documents for reflection. Meanwhile, unless modification information is correctly reflected in the design documents along with a modification of the system, the time requested to identify an influence range by the modification increases.

For example, the overall design document is very useful information for identifying the influence range by a modification. The reflection to the overall design document is performed by linking all the design documents horizontally to each other and determining which part of the design documents will be influenced. For example, when the ID of a certain function is changed, the overall design document is updated by an operator who manually determines how much the influence extends by referring to multiple design documents.

However, a large-scale system may involve 30,000 or more files of design documents, and it is difficult to manually perform a reflection operation on the overall design document along with a system modification. Since high levels of skill and knowledge are requested to determine whether there is an influence, there is a risk that, when an operator with low skill levels makes the determination, the operator may cause reflection omission or erroneous reflection.

A conceivable method for avoiding this includes: finely defining the format of each design document described in a grid paper format (for example, information XX is input to a cell A2), and creating the overall design document by extracting and combining information pieces from single-function design documents. However, it is requested to determine in advance the precise formats such as what kind of information is to be input to what part of the design document, and this work takes time and effort. This method is not applicable unless the design documents are written exactly as the formats.

Another conceivable method is to use a tool that automatically generates a design document from comments in the source code. However, in this method, the format is fixed to some extent on the tool side, and expertise is requested to read the automatically generated design document. In addition, this method first requests the source code, and therefore is not usable when a design document is desired before coding.

Another conceivable method is to automatically generate a design document from logs by a method based on log analysis. For example, a DFD or the like is automatically generated by associating each process and a value of an item in a database based on a time when a screen was accessed and a query issued to the database around that time. However, this method does not obtain comprehensive information unless the actual environment is comprehensively tested. When the actual environment is a production environment, the test is not executable in many cases.

Against this background, the present embodiment will be described regarding a design document management method of automatically generating information expressing the structure of a system from multiple design documents about the system. A processing example of the information processing apparatus 101 will be described below.

(1) The information processing apparatus 101 acquires multiple design documents about a system. The design documents are, for example, design documents in a grid paper format, and are single-function design documents (functional design documents) such as a screen layout design document and a continuous form process design document. The design document in the grid paper format is a design document of a type in which information is input to cells set on a sheet like grid paper. The position of each cell is specified by, for example, a row and a column on the sheet.

The example of FIG. 1 assumes that "design documents 110-1 to 110-10" are acquired as the multiple design documents about the system.

(2) The information processing apparatus 101 identifies multiple label items representing elements of the system based on appearance frequency information of character strings included in the multiple design documents acquired. Each of the character strings is a group of one or more characters arranged as a unit of data, and includes, for example, an alphanumeric character, a kanji character, a kana character, a symbol, and so on.

The character string may be, for example, a character string in a cell of each design document, or may be a combined character string in which character strings in adjacent cells of each design document are concatenated.

The elements of the system are, for example, elements such as functions, processes, data, and databases to constitute the system.

A character string representing an element of a system tends to appear in all of multiple design documents and not to be information peculiar to a specific design document. A character string that appears in all of multiple design documents and is not information peculiar to a specific design document may be said to be universal (format) information. For example, the higher the likelihood that a character string may be universal information, the more likely the character string is to represent an element of a system.

For this reason, for example, the information processing apparatus 101 calculates an evaluation value indicating how likely a character string is to be universal information in multiple design documents based on the appearance frequency information of the character string. The information processing apparatus 101 may determine multiple label items based on the calculated evaluation values of the character strings.

The example of FIG. 1 assumes that "label items L1 to L7" are identified as the multiple label items representing the elements of the system. The label items L1 to L7 each represent, for example, a system function, a process, a database (table), or the like.

(3) The information processing apparatus 101 generates structure information in which the identified multiple label items are hierarchized based on the appearance positions at which the character string corresponding to each of the multiple label items appears in the multiple design documents. To hierarchize the multiple label items means to express the multiple label items in a hierarchical structure. The structure information of the system is expressed by, for example, tree structure data in which the label items are hierarchized as nodes with linking relationships between the label items set as edges.

When the appearance positions of a character string in multiple design documents do not vary among the multiple design documents, the character string is more likely to be information at a conceptually high level. For example, the header of a process existing in all the sheets (design documents) often appears in the same row and same column. On the other hand, the header of a table that appears in all the sheets tends to appear at positions largely varying in a row direction.

In the case of expressing a sequence of processes and data to be accessed, it may be easier for humans to understand them when a process at a conceptually higher level is arranged in a higher tier or the processes are arranged in higher tiers than those of the data. For this reason, for example, the information processing apparatus 101 may determine the tier at which to arrange each label item in accordance with the variation degree of the appearance positions of the character string corresponding to the label item among the multiple design documents.

In the design documents, for example, a certain process and data handled in the process are often described at positions closer to each other than those of other kinds of information. In the design documents, processes consecutive in processing order are often described at positions closer to each other than those of processes not consecutive in the processing order. For this reason, for example, the information processing apparatus 101 may determine the linking relationship (parent-child relationship) between label items at adjacent tiers in consideration of the positional relationship between the character strings corresponding to the respective label items in each of the design documents.

The example in FIG. 1 assumes that structure information 120 is generated. The structure information 120 expresses the label items L1 to L7 hierarchized in a tree form. In the structure information 120, the label item L1 is arranged at the highest tier 1, the label items L7 and L3 are arranged at the tier 2, and the label items L6, L5, L2, and L4 are arranged at the tier 3. In the structure information 120, for example, the label items L1 and L7 are directly linked together and the label items L7 and L6 are directly linked together.

As described above, the information processing apparatus 101 is capable of extracting character strings representing elements of a system from multiple design documents about the system and automatically generating information expressing the structure of the system (for example, the structure information 120). For example, the information processing apparatus 101 is capable of hierarchizing elements such as functions, processes, and data of the system and thereby expressing the elements in a tree form.

Therefore, the user is enabled to recognize the relationships between the elements in the system, and may easily check specifications to be standardized throughout the entire system. Since it is not requested to finely define the formats of the design documents, it is possible to reduce the load and time requested for the work of determining the precise formats in advance and to reduce the load on the developer or the like for creating the design documents.

In the example illustrated in FIG. 1, the user is enabled to recognize the relationships between the elements such as the functions, the processes, and the data in the system by referring to the structure information 120. This enables the user to check the specifications to be standardized throughout the entire system without checking the contents of all the design documents 110-1 to 110-10, and to, for example, easily identify an influence range or the like due to a modification of the system.

(System Configuration Example of Information Processing System 200)

Next, description will be given of a system configuration example of an information processing system 200 including the information processing apparatus 101 illustrated in FIG. 1. A case where the information processing apparatus 101 illustrated in FIG. 1 is applied to a design document management server 201 in the information processing system 200 will be described herein as an example. The information processing system 200 is applied to, for example, a service that supports system development.

Figure 2:
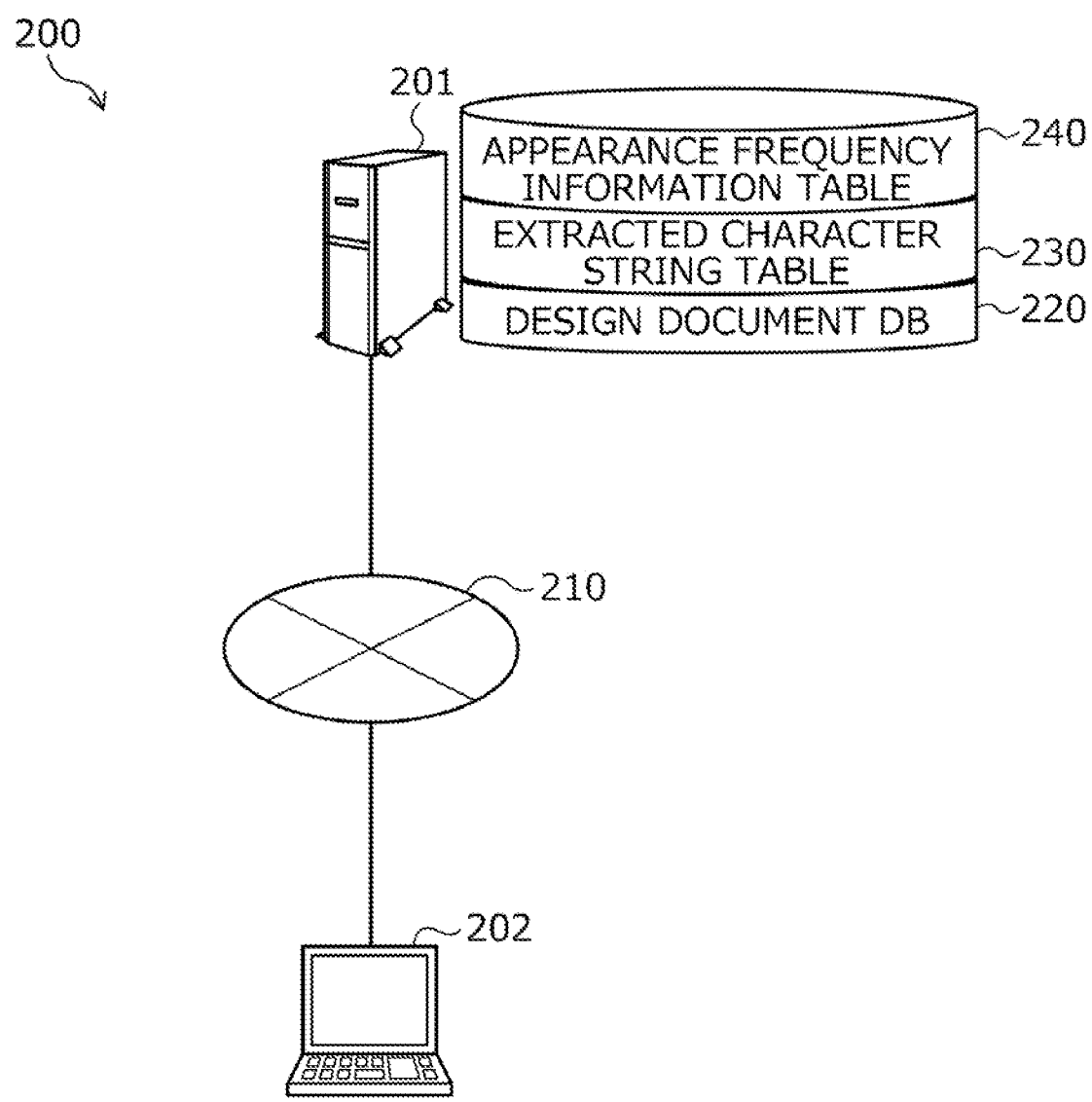
FIG. 2 is an explanatory diagram illustrating a system configuration example of an information processing system.

FIG. 2 is an explanatory diagram illustrating a system configuration example of the information processing system 200. In FIG. 2, the information processing system 200 includes the design document management server 201 and a client apparatus 202. In the information processing system 200, the design document management server 201 and the client apparatus 202 are coupled to each other via a wired or wireless network 210. The network 210 is, for example, the Internet, a local area network (LAN), a wide area network (WAN), or the like.

The design document management server 201 is a computer that includes a design document database (DB) 220, an extracted character string table 230, and an appearance frequency information table 240, and that manages design documents about a system. The design document DB 220 stores the design documents. The design documents are created in, for example, the client apparatus 202, and are registered in the design document DB 220.

Specific examples of the design documents about the system will be described later with reference to FIGS. 4A to 4D. The contents stored in the extracted character string table 230 and the appearance frequency information table 240 will be described later with reference to FIGS. 5 and 6.

The client apparatus 202 is a computer used by a user of the information processing system 200. The user is, for example, a developer of the system. The client apparatus 202 is, for example, a personal computer (PC), a tablet PC, or the like.

The design document management server 201 and the client apparatus 202 are separately provided herein, but the present disclosure is not limited to this configuration. For example, the design document management server 201 may be implemented by the client apparatus 202. The information processing system 200 may include multiple client apparatuses 202.

(Hardware Configuration Example of Design Document Management Server 201)

FIG. 3 is a block diagram illustrating a hardware configuration example of the design document management server 201. In FIG. 3, the design document management server 201 includes a central processing unit (CPU) 301, a memory 302, a disk drive 303, a disk 304, a communication interface (I/F) 305, a portable recording medium I/F 306, and a portable recording medium 307. These components are coupled to one another through a bus 300.

The CPU 301 controls the entire design document management server 201. The CPU 301 may include multiple cores. The memory 302 includes, for example, a read-only memory (ROM), a random-access memory (RAM), a flash ROM, and the like. For example, the flash ROM stores a program of an operating system (OS), the ROM stores application programs, and the RAM is used as a work area for the CPU 301. The programs stored in the memory 302 are loaded by the CPU 301, thereby causing the CPU 301 to execute coded processing.

The disk drive 303 controls reading and writing of data from and to the disk 304 in accordance with the control of the CPU 301. The disk 304 stores the data written under the control of the disk drive 303. Examples of the disk 304 include a magnetic disk, an optical disk, and the like.

The communication I/F 305 is coupled to the network 210 via a communication line, and is coupled to an external computer (for example, the client apparatus 202 illustrated in FIG. 2) via the network 210. The communication I/F 305 functions as an interface between the network 210 and the inside of the design document management server 201 and controls input and output of data from and to the external computer. As the communication I/F 305, for example, a modem, a LAN adapter, or the like may be used.

The portable recording medium I/F 306 controls reading and writing of data from and to the portable recording medium 307 in accordance with the control of the CPU 301. The portable recording medium 307 stores the data written under the control of the portable recording medium I/F 306. Examples of the portable recording medium 307 include a compact disk (CD)-ROM, a Digital Versatile Disk (DVD), a Universal Serial Bus (USB) memory, and the like.

The design document management server 201 may include, for example, an input device, a display, and so on in addition to the components described above. The client apparatus 202 illustrated in FIG. 2 may also be implemented by a hardware configuration similar to the hardware configuration of the design document management server 201. However, the client apparatus 202 includes an input device, a display, and the like in addition to the above-described components.

(Specific Examples of Design Documents)

Next, specific examples of the single-function design documents will be described with reference to FIGS. 4A to 4D.

FIGS. 4A, 4B, 4C, and 4D are explanatory diagrams illustrating specific examples of the design documents. In FIGS. 4A to 4D, design documents 401 to 404 are examples of design documents in a grid paper format, which are described in the same format. The design documents 401 to 404 are multiple design documents about online processing of the system, and correspond to respective sheets in the same file (for example, online processing design document_samples).

In each of the design documents 401 to 404, items such as a sheet name and a creation date are described and processing details of a preprocess, a main process, and screen editing are described from left to right and from top to bottom. The position of each cell in each of the design documents 401 to 404 is expressed by a combination of a column number (alphabet: A, B, . . . ) and a row number (number: 1, 2, . . . ).

For example, in the design document 401, the position of the cell in which the character string "SHEET NAME" is input is (A, 1). In the design document 401, the position of the cell in which the character string "1. PREPROCESS" is input is (A, 10). In the design document 401, the position of the cell in which the character string "SESSION INFORMATION: LOGGED-IN USER INFORMATION" is input is (A, 11). The design documents 110-1 to 110-10 illustrated in FIG. 1 correspond to, for example, the design documents 401 to 404.

(Contents Stored in Tables 230 and 240)

Next, contents stored in the extracted character string table 230 and the appearance frequency information table 240 included in the design document management server 201 will be described with reference to FIGS. 5 and 6. The extracted character string table 230 and the appearance frequency information table 240 are implemented by, for example, a storage device such as the memory 302 or the disk 304 illustrated in FIG. 3.

FIG. 5 is an explanatory diagram illustrating an example of contents stored in the extracted character string table 230. In FIG. 5, the extracted character string table 230 has fields of character string/combined character string, appearance position, and group, and stores, as records, information on extracted character strings (for example, extracted character string information 500-1 and 500-2) by setting an information piece in each of the fields.

The character string/combined character string indicates a character string or a combined character string extracted from the design document. The combined character string is a combination of adjacent character strings extracted from the same row or column in the design document. The character strings included in the combined character string are expressed as concatenated by an AND symbol "&".

The appearance position indicates the appearance position of the character string/combined character string. The appearance position is expressed by a combination of a column number (alphabet: A, B, . . . , AA, AB, . . . ), a row number (number: 1, 2, . . . ), and a design document ID (d1, d2, . . . ). For example, (A, 1, d1) indicates the first row of the A column in the design document d1. In the column number, AA, AB, . . . follow Z.

The group indicates a group to which the character string belongs. The group is a group in which the same or similar character strings at different positions are grouped (classified). For example, a group g1 corresponds to the character string "SHEET NAME" included in the design document

Figure 4A:
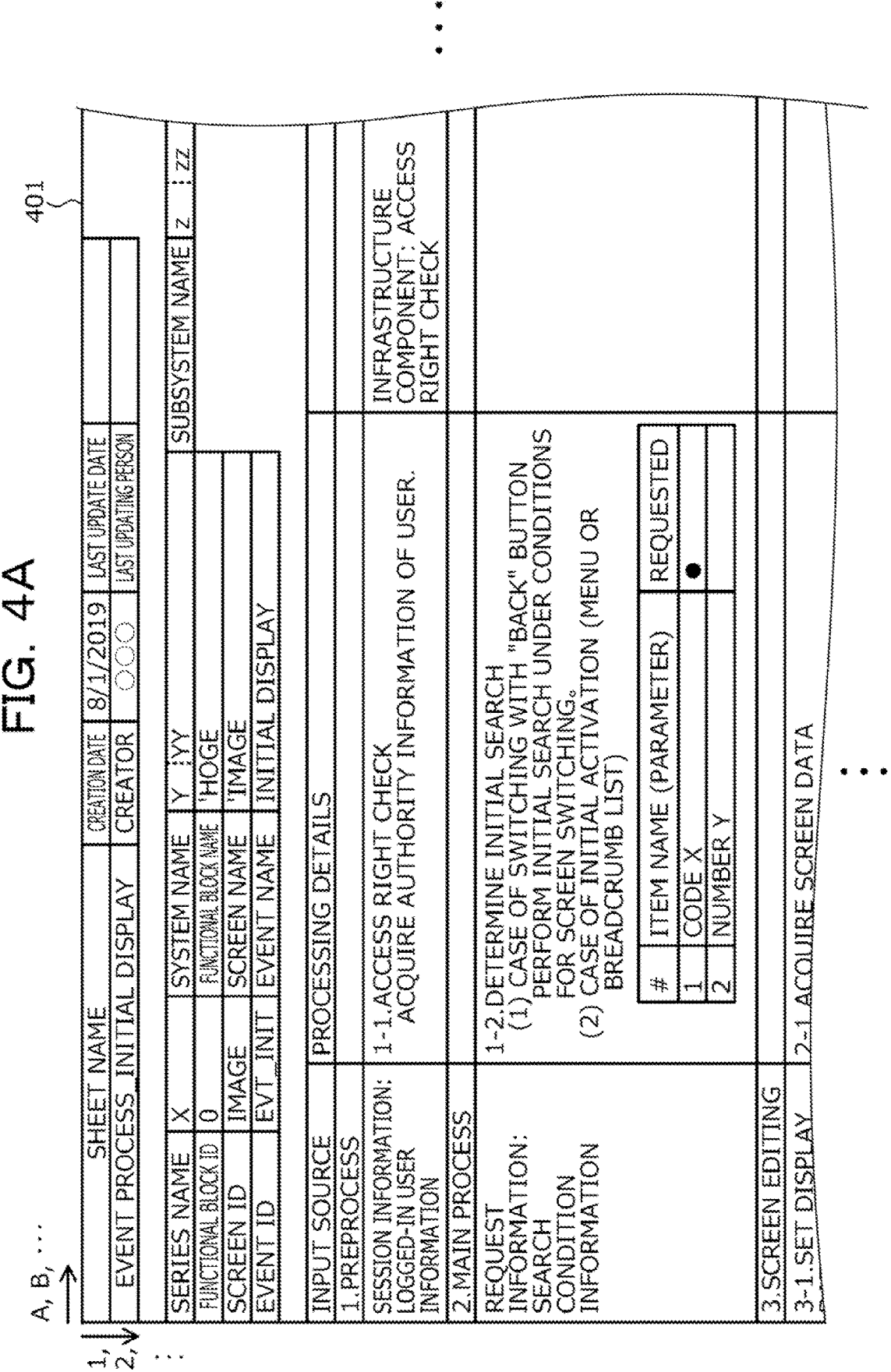
FIG. 4A is an explanatory diagram illustrating a specific example of a design document (part 1)
Figure 4D:
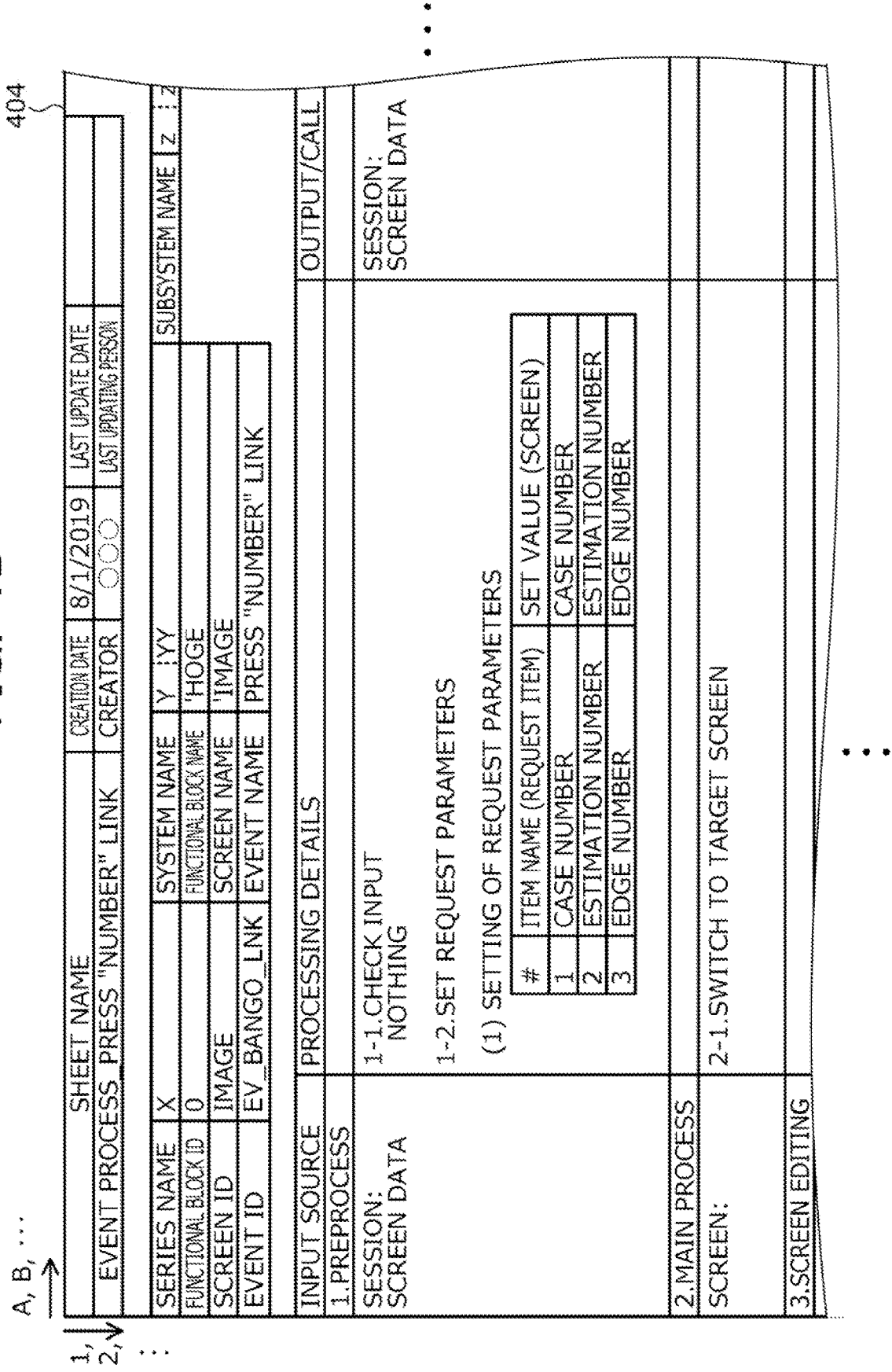
FIG. 4D is an explanatory diagram illustrating the specific example of a design document (part 4)

401 illustrated in FIG. 4A. In the case of a combined character string, groups to which the respective character strings included in the combined character string belong are expressed as concatenated by the AND symbol "&". For example, a combined group g1&g2 corresponds to a combination of the groups g1 and g2.

Figure 6:
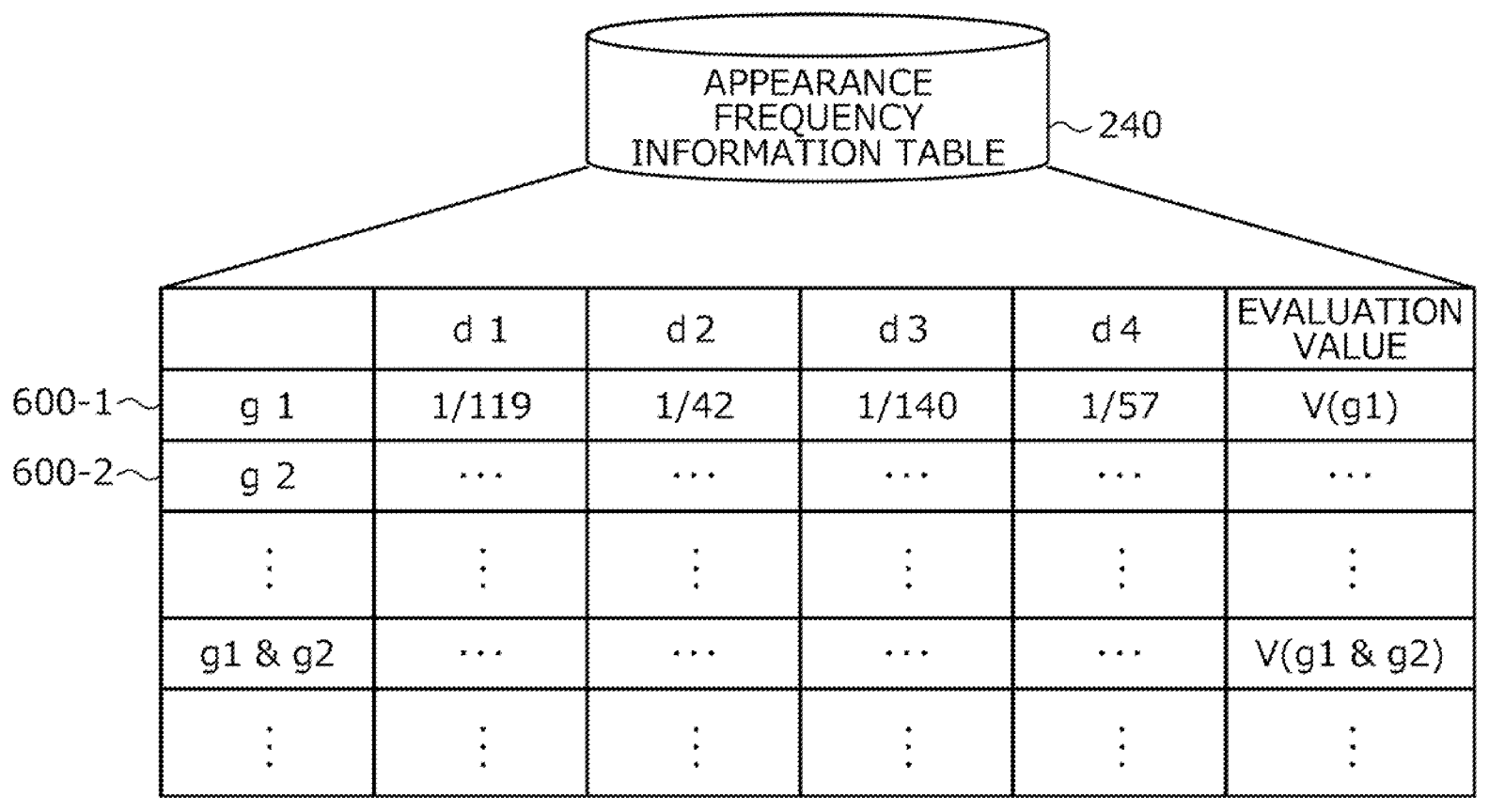

FIG. 6 is an explanatory diagram illustrating an example of contents stored in the appearance frequency information table 240. In FIG. 6, the appearance frequency information table 240 stores a term frequency-inverse document frequency (tf-idf) value of each group in each design document. The group indicates groups into which character strings are classified. Then, g# is an identifier that uniquely identifies a group (#=1, 2, . . . ). The appearance frequency information table 240 also stores the tf-idf value of each combined group in each design document.

The combined group is equivalent to a combined character string and represents groups, concatenated by the AND symbol "&", to which the respective character strings included in the combined character string belong. The appearance frequency information table 240 stores an evaluation value of each group and an evaluation value of each combined group. The evaluation value indicates how likely a character string of a group or a combined character string of a combined group is to be universal information in the multiple design documents.

(Functional Configuration Example of Design Document Management Server 201)

Figure 7:
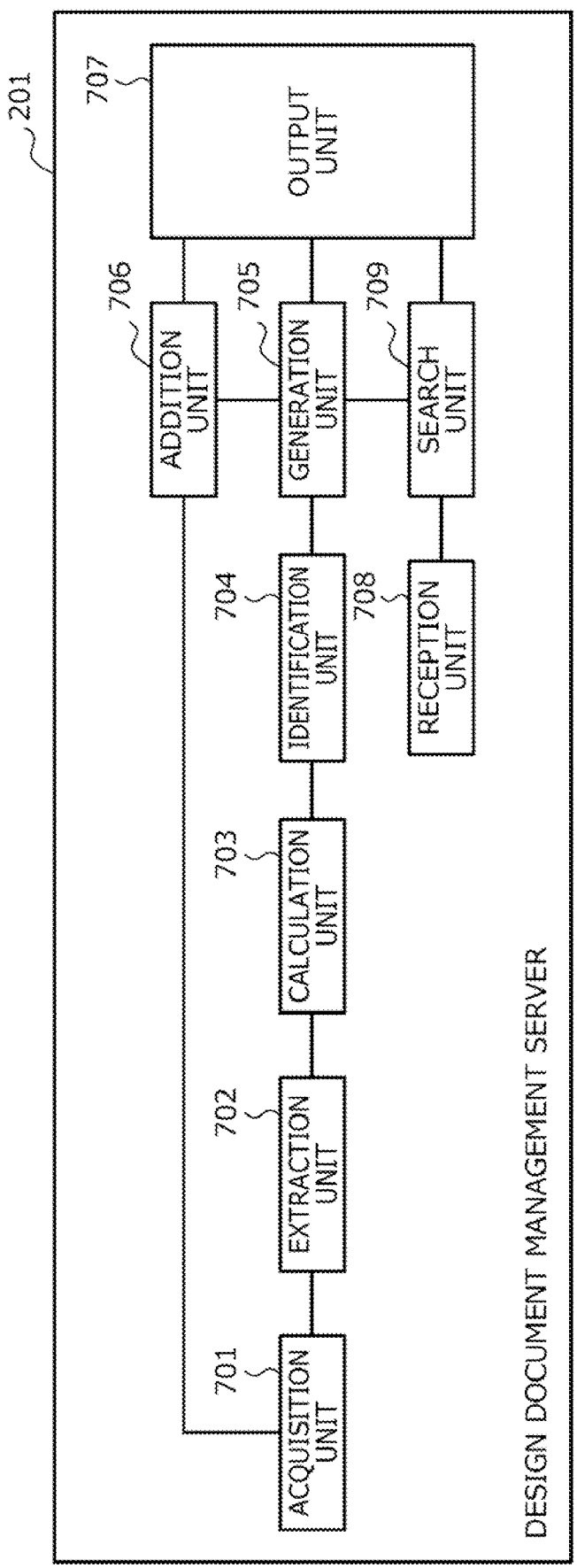
FIG. 7 is a block diagram illustrating a functional configuration example of the design document management server.

FIG. 7 is a block diagram illustrating a functional configuration example of the design document management server 201. In FIG. 7, the design document management server 201 includes an acquisition unit 701, an extraction unit 702, a calculation unit 703, an identification unit 704, a generation unit 705, an addition unit 706, an output unit 707, a reception unit 708, and a search unit 709. The acquisition unit 701 to the search unit 709 are functions constituting a control unit, and these functions are each implemented, for example, by using the communication I/F 305 or by causing the CPU 301 to execute a program stored in the storage device such as the memory 302, the disk 304, or the portable recording medium 307 illustrated in FIG. 3. The processing results obtained by these functional units are stored, for example, in the storage device such as the memory 302 or the disk 304.

The acquisition unit 701 acquires multiple design documents about the system. The design documents are, for example, design documents in a grid paper format, and are single-function design documents such as a screen layout design document and a continuous form process design document. The multiple design documents are, for example, a set of design documents described in the same format, and are a set of multiple sheets of the same file, a set of files in the same directory, or the like. The multiple design documents are designated by, for example, the client apparatus 202 illustrated in FIG. 2.

In the following description, the multiple design documents will be referred to as "design documents d1 to dn" in some cases. Certain one or more design documents among the design documents d1 to dn are referred to as "a design document or documents di" (i=1, 2, . . . , n) in some cases. For example, the design documents 401 to 404 illustrated in FIGS. 4A to 4D are equivalent to the design documents d1 to dn (n=4).

For example, the acquisition unit 701 acquires the design documents 401 to 404 (see FIGS. 4A to 4D) designated by the client apparatus 202 from the design document DB 220 (see FIG. 2). Instead, the acquisition unit 701 may acquire the design documents 401 to 404 from the client apparatus 202.

The extraction unit 702 extracts character strings included in the acquired design documents d1 to dn. Each character string is a group of one or more characters arranged as a unit of data. For example, the extraction unit 702 extracts character strings from all the cells in each design document di. Each cell is one of fields in the design document di in the grid paper format.

In this extraction, the extraction unit 702 acquires, as the appearance position of each character string, the position of the cell from which the character string is acquired. The appearance position of the character string is expressed by a combination of a column number (alphabet: A, B, . . . ), a row number (number: 1, 2, . . . ), and a design document ID (d1, d2, . . . , dn). The extracted character string is stored, for example, in the extracted character string table 230 as illustrated in FIG. 5 in association with the appearance position (the column number, the row number, and the design document ID) of the acquired character string.

Next, the extraction unit 702 groups the extracted character strings. To be more detail, for example, the extraction unit 702 classifies the exactly same character strings into the same group. Instead, the extraction unit 702 may calculate a similarity between character strings and classify character strings having a similarity equal to or greater than a threshold into the same group.

The similarity between character strings is expressed by a cosine similarity, a semantic similarity, or the like. For example, the cosine similarity is obtained by dividing each of character strings into words by morphological analysis, forming a vector composed of the divided words as elements, and calculating an angle between the vectors. The grouping result is stored in the extracted character string table 230 in association with the extracted character strings, for example.

The extraction unit 702 may extract a combined character string in which character strings at adjacent cells in each design document di are concatenated. For example, the extraction unit 702 acquires a group of character strings from all the cells in the same row or column. The extraction unit 702 extracts a combined character string in which character strings in at most p adjacencies (p is a natural number of 1 or more) in the acquired group of character strings are concatenated together. A blank cell is ignored.

For example, it is assumed that a character string a, a character string b, and a character string c are arranged in this order in the same row (or the same column). In this case, combined character strings in at most two adjacencies are as follows. A combined character string is a string in which character strings in { } are concatenated in the order of appearance.

One adjacency: {character string a, character string b}, {character string b, character string c}

Two adjacencies: {character string a, character string b, character string c}

An example of extraction of combined character strings will be described with reference to FIG. 8. The example of extraction of combined character strings will be described by taking the ninth row of the design document 402 illustrated in FIG. 4B as an example. Then, p in p adjacencies is set to "p=2".

Figure 8:
FIG. 8 is an explanatory diagram illustrating an example of extraction of combined character strings.

FIG. 8 is an explanatory diagram illustrating an example of extraction of combined character strings. FIG. 8 illustrates the ninth row in the design document 402 illustrated in FIG. 4B. In this case, the extraction unit 702 acquires the character string "INPUT SOURCE" from the cell (A, 9), the character string "PROCESSING DETAILS" from the cell (J, 9), and the character string "OUTPUT/CALL DESTINATION" from the cell (AZ, 9).

The extraction unit 702 combines the acquired character strings to extract combinations of character strings in one adjacency {INPUT SOURCE, PROCESSING DETAILS} and {PROCESSING DETAILS, OUTPUT/CALL DESTINATION} as combined character strings. The extraction unit 702 combines the acquired character strings to extract a combination of character strings in two adjacencies {INPUT SOURCE, PROCESSING DETAILS, OUTPUT/CALL DESTINATION} as a combined character string.

Each of the extracted combined character strings is stored in the extracted character string table 230 in association with, for example, the appearance position of the combined character string and the grouping results of the respective character strings included in the combined character string. The appearance position of the combined character string is expressed by a combination of a column number (alphabet: A, B, . . . ), a row number (number: 1, 2, . . . ), and a design document ID (d1, d2, . . . , dn).

For a combined character string in which character strings in the same row are concatenated, the column number and the row number correspond to, for example, the position of the cell from which the leftmost character string is acquired. For a combined character string in which character strings in the same column are concatenated, the column number and the row number correspond to, for example, the position of the cell from which the uppermost character string is acquired. The combined character string may be expressed by a combination of groups (combined group).

Returning to description of FIG. 7, the calculation unit 703 calculates appearance frequency information of the extracted character string. The appearance frequency information of the character string includes, for example, the appearance frequency of the character string in each design document di and the ratio of the design documents including the character string among the design documents d1 to dn. The appearance frequency of the character string in each design document di may be said to be an index indicating how important the character string is in each design document di. The ratio of the design documents including the character string among the design documents d1 to dn may be said to be an index indicating a proportion at which the character string appears in all the design documents d1 to dn.

For example, the calculation unit 703 calculates the tf-idf value in each design document di for each group formed by grouping the extracted character strings. The calculation unit 703 calculates the tf-idf value in each design document di for each combined group corresponding to the extracted combined character string.

tf (term frequency) is equivalent to the appearance frequency of a character string in each design document di. The tf value is an index value based on the idea that a character string appearing more frequently in a document is more likely to be important. Then, idf (inverse document frequency) is equivalent to the inverse of the ratio of the design documents including the character string among the design documents d1 to dn. The idf value is an index value based on the idea that a character string appearing in many documents is unlikely to be a feature word for a single document.

An example of calculation of the tf-idf value based on the design documents 401 to 404 (equivalent to "the design documents d1 to d4") illustrated in FIGS. 4A to 4D will be described.

First, an example of calculation of the tf-idf value of a single group will be described by taking the group g1 as an example. The character string of the group g1 is "SHEET NAME". The appearance positions of the character string "SHEET NAME" are the appearance positions specified in the extracted character string information 500-1 in the extracted character string table 230. When there are multiple character strings belonging to a group g#, any one of the character strings in the group g# is set as the character string of the group g#.

For example, the calculation unit 703 may calculate the tf value of each group in each design document di by using the following equation (1). tf (g#, di) denotes a tf value of a group g# in a design document di. The total number of appearances of character strings across all the cells in the design document di corresponds to the number of cells in which characters are input in the design document di.

$$tf(g\#,di) = \{\text{the number of appearances of the character string of a group } g\# \text{ in a design document } di\}/\{\text{the total number of appearances of character strings across all the cells in the design document } di\} \quad (1)$$

In this case, the tf value of the group g1 in the design document d1 is as follows:

$$tf(g1,d1) = \{\text{the number of appearances of the character string of the group } g1 \text{ in the design document } d1\}/\{\text{the total number of appearances of character strings across all the cells in the design document } d1\} = 1/119$$

When calculated in the same way, the tf value of the group g1 in the design document d2 is "tf (g1, d2)=1/42". The tf value of the group g1 in the design document d3 is "tf (g1, d3)=1/140". The tf value of the group g1 in the design document d4 is "tf (g1, d4)=1/57".

For example, the calculation unit 703 is capable of calculating the idf value of each group in the design documents d1 to dn by using the following equation (2). idf (g#) denotes an idf value of a group g# in the design documents d1 to dn.

$$idf(g\#) = \log\{\text{the total number of design documents } n/\{\text{the number of design documents where the character string of the group } g\# \text{ appears}\}\} + 1 \quad (2)$$

In this case, the idf value of the group g1 in the design documents d1 to d4 is "idf (g1)=log(4/4)+1=1".

For example, the calculation unit 703 calculates the tf-idf value of the group g# in each design document di by multiplying the calculated tf value of the group g# in each design document di by the idf value of the group g# in the design documents d1 to dn.

In this case, the tf-idf value of the group g1 in the design document d1 is "tf-idf (g1, d1)=1/119". The tf-idf value of the group g1 in the design document d2 is "tf-idf (g1, d2)=1/42". The tf-idf value of the group g1 in the design document d3 is "tf-idf (g1, d3)=1/140". The tf-idf value of the group g1 in the design document d4 is "tf-idf (g1, d4)=1/57".

Next, an example of calculation of the tf-idf value of a group g10 will be described. A character string of the group g10 is "CLEAR BUTTON". The appearance position of the character string "CLEAR BUTTON" is the appearance position specified in the extracted character string information in the extracted character string table 230.

In this case, the tf value of the group g10 in the design document d1 is "tf (g10, d1)=1/119". The tf value of the group g10 in the design document d2 is "tf (g10, d2)=0". The tf value of the group g10 in the design document d3 is "tf (g10, d3)=0". The tf value of the group g10 in the design document d4 is "tf (g10, d4)=0". The idf value of the group g10 in the design documents d1 to d4 is "idf (g10)=log (4/1)+1=2 log 2+1≈2.39".

The tf-idf value of the group g10 in the design document d1 is "tf-idf (g10, d1)≈0.02)". The tf-idf value of the group g10 in the design document d2 is "tf-idf (g10, d2)=0". The tf-idf value of the group g10 in the design document d3 is "tf-idf (g10, d3)=0". The tf-idf value of the group g10 in the design document d4 is "tf-idf (g10, d4)=0".

Next, an example of calculation of the tf-idf value of the combined group g1&g2 will be described. The tf-idf value of the combined group g1&g2 is equivalent to the tf-idf value of the combined character string in which the character string of the group g1 and the character string of the group g2 are concatenated. The character string of the group g2 is "CREATION DATE". The appearance positions of the combined character string "SHEET NAME&CREATION DATE" are the appearance positions specified in the extracted character string information in the extracted character string table 230.

For example, the calculation unit 703 is capable of calculating a tf value of each combined group in each design document di by using the following equation (3). tf (g#&g$, di) denotes a tf value of a combined group g#&g$ in a design document di. The combined group g#&g$ denotes a combination of a group g# and a group g$ (#≠$ and $=1, 2, . . . ).

$$tf(g\#\&g\$, di) = \{\text{the number of appearances of the combined character string in a combined group } g\#\&g\$ \text{ in a design document } di\}/\{\text{the total number of appearances of all the combined groups in the design document } di\} \quad (3)$$

In this case, the tf value of the combined group g1&g2 in the design document d1 is as follows. The calculation of N_{combination} will be omitted.

$$tf(g1\&g2, d1) = \{\text{the number of appearances of the combined character string of the combined group } g1\&g2 \text{ in the design document } d1\}/\{\text{the total number of appearances of all the combined groups in the design document } d1\} = 1/N\_\{\text{combination}\}$$

When calculated in the same way, the tf values of the combined group g1&g2 in the design documents d2, d3, and d4 are "tf (g1&g2, d2)=tf (g1&g2, d3)=tf (g1&g2, d4)=1/N_{combination}".

For example, the calculation unit 703 is capable of calculating the idf value of each combined group in the design documents d1 to dn by using the following expression (4). idf (g#&g$) denotes the idf value of a combined group g#&g$ in the design documents d1 to dn.

$$idf(g\#\&g\$) = \log\{\text{the total number of design documents } n/\{\text{the number of design documents where a combined character string of a combined group } g\#\&g\$ \text{ appears}\}\} + 1 \quad (4)$$

In this case, the idf value of the combined group g1&g2 in the design documents d1 to d4 is "idf (g1&g2)=log (4/4)+1=1".

For example, the calculation unit 703 calculates the tf-idf value of the combined group g#&g$ in each design document di by multiplying the calculated tf value of the combined group g#&g$ in each design document di by the idf value of the combined group g#&g$ in the design documents d1 to dn. In this case, the tf-idf value of the group g1&g2 in the design document d1 is "tf-idf (g1&g2, d1)=1/N_{combination}".

The calculated tf-idf value of each group in each design document di is stored, for example, in the appearance frequency information table 240 illustrated in FIG. 6. The calculated tf-idf value of each combined group in each design document di is stored, for example, in the appearance frequency information table 240.

The identification unit 704 identifies multiple label items representing elements of the system based on the calculated appearance frequency information of the character strings. The elements of the system are, for example, elements such as functions, processes, data, and databases to constitute the system. A character string representing an element of the system tends to appear in all the design documents d1 to dn, and not to be information peculiar to a specific design document.

For this reason, the identification unit 704 calculates, for example, an evaluation value V indicating how likely a character string is to be universal information in the design documents d1 to dn, based on the calculated appearance frequency information of the character string. A character string that appears in all the design documents d1 to dn and is not information peculiar to a specific design document may be said to be universal (format) information. For example, the higher the likelihood that a character string may be universal information, the more likely the character string is to represent an element of a system.

For example, the identification unit 704 calculates the evaluation value V of each character string (group or combined group) by adding up the calculated tf-idf values thereof in the design documents d1 to dn with reference to the appearance frequency information table 240. The calculated evaluation value V is stored, for example, in the appearance frequency information table 240. For example, the evaluation value V (g1) of the group g1 is a sum of the tf-idf values in the design documents d1 to d4 (1/119+1/42+1/140+1/57).

In this case, it may be said that the lower the evaluation value V, the lower the peculiarity of information contained in a character string (the character string of a group or the combined character string of a combined group). On the other hand, when the evaluation value V is too low, there is a possibility that the character string is information that does not represent a feature of the system. The evaluation value V may be, for example, an average value of the tf-idf values in the design documents d1 to dn.

For example, the identification unit 704 may identify each character string having the calculated evaluation value V within a predetermined range R as a label item. For example, when the evaluation value V (g1) of the group g1 is within the predetermined range R, the character string "SHEET NAME" is identified as a label item. When the evaluation value V (g1&g2) of the group g1&g2 is within the predetermined range R, the combined character string "SHEET NAME&CREATION DATE" is identified as a label item.

Thus, a character string (a character string of a group or a combined character string of a combined group) that is highly likely to be universal information in the design documents d1 to dn may be identified as a label item. However, when the character strings identified as the label items include a character string of a group in a combined group identified as a label item, the identification unit 704 excludes the character string from the label items. For example, in a case where the character string "SHEET NAME" and the combined character string "SHEET NAME&CREATION DATE" are identified as the label items, the character string "SHEET NAME" is excluded from the label items.

The predetermined range R may be set to any range. For example, by using multiple design documents about an existing system that has been already developed, an operator analyzes how much the evaluation value V of a character string representing an element of the system is. Based on the analyzed value, the operator may set, as the predetermined range R, a range in which the evaluation value V of the character string representing the element of the system falls.

In the following description, multiple label items will be referred to as "label items L1 to Lm", and certain one or more label items among the label items L1 to Lm will be referred to as "a label item or label items Lj" (j=1, 2, ..., m) in some cases.

The generation unit 705 generates system structure information based on the appearance positions of the character string corresponding to each label item Lj of the identified label items L1 to Lm in the multiple design documents d1 to dn. The system structure information is structure information in which the label items L1 to Lm are hierarchized. The character string corresponding to each label item Lj is the character string identified as the label item Lj.

For example, based on the appearance position of a character string corresponding to each label item Lj in each design document di including the character string, the generation unit 705 calculates a variation degree of the appearance positions of the character string among the design documents d1 to dn. The generation unit 705 generates system structure information based on the calculated variation degree of the appearance positions of the character string and the positional relationship in each design document di between the character strings corresponding to the respective label items Lj.

The variation degree of the appearance positions of the character string of a single group may be expressed by using, for example, a standard deviation or variance (sample variance) of the appearance positions. To be more detail, for example, the variation degree of the appearance positions of the character string of a single group is expressed by the sum of "the sample variance in a lateral direction (column direction)" and "the sample variance in a vertical direction (row direction)". The coordinate information in the lateral direction (column direction) is calculated by, for example, converting A to 1 or the like.

The variation degree of the appearance positions of a combined character string in a combined group may be expressed by using, for example, the following equation (5). The combined group is denoted by a group G (={gX1:: gX2:: . . . ::gXn} where n≥1). Var_{gXi} denotes the variation degree of a single group gXi.

$$\text{Var}\_\{G\} = \Sigma\_\{Xi \in \{gX1, \ldots, gXn\}\} \text{Var}\_\{gXi\} \qquad (5)$$

The above equation (5) means that the variation degree of the combined group is equivalent to the sum of the variation degrees of the groups included in the combined group.

In an example, it is assumed that a combined character string of a combined group g1&g2 and a character string of a group g20 are identified as label items. The character string of the group g1 is "SHEET NAME". The appearance positions of the character string "SHEET NAME" are the appearance positions specified in the extracted character string information 500-1 in the extracted character string table 230. The character string of the group g2 is "CREATION DATE". The appearance positions of the character string "CREATION DATE" are the appearance positions specified in the extracted character string information 500-2 in the extracted character string table 230. The character string of the group g20 is "3. SCREEN EDITING" and the appearance positions of the character string "3. SCREEN EDITING" are "(A, 40, d1), (A, 22, d2), (A, 34, d3), and (A, 28, d4)".

In this case, in order to calculate the variation degree of the combined group g1&g2, the generation unit 705 calculates the variation degree of the group g1 and the variation degree of the group g2. For example, the variation degree of the group g1 is as follows.

$$\begin{aligned}
\text{Var}\_\{g1\} &= \text{(the sample variance in the lateral direction)} + \\
&\quad \text{(the sample variance in the vertical direction)} \\
&= ((1-1)^\wedge 2 + (1-1)^\wedge 2 + (1-1)^\wedge 2 + (1-1)^\wedge 2)/4 + \\
&\quad ((1-1)^\wedge 2 + (1-1)^\wedge 2 + (1-1)^\wedge 2 + (1-1)^\wedge 2)/4 \\
&= 0
\end{aligned}$$

The variation degree of the combined group g1&g2 is as follows.

$$\begin{aligned}
\text{Var}\_\{g1::g2\} &= \text{Var}\_\{g1\} + \text{Var}\_\{g2\} \\
&= 0
\end{aligned}$$

The variation degree of the group g20 is as follows.

$$\begin{aligned}
\text{Var}\_\{g20\} &= 0 + ((40-31)^\wedge 2 + (22-31)^\wedge 2 + (34-31)^\wedge 2 + \\
&\quad (28-31)^\wedge 2)/4 \\
&= (81 + 81 + 9 + 9)/4 \\
&= 45
\end{aligned}$$

Which tier each label item Lj is to belong to is determined based on, for example, a variation degree range for each tier set in advance. For example, a variation degree range "less than v1" is set in association with a tier h. Then, a variation degree range (v1 or more to less than v2) is set in association with a tier (h+1). The tier (h+1) is a tier lower by one level than the tier h. Then, a variation degree range (v2 or more to less than v3) is set in association with a tier (h+2).

In this case, for example, when the variation degree of the appearance positions of a character string X in a certain group is less than v1, the generation unit 705 arranges the label item corresponding to the character string X at the tier h. When the variation degree of the appearance positions of a combined character string Y&Z in a certain combined group is equal to or more than v1 and less than v2, the generation unit 705 arranges the label item corresponding to the combined character string Y&Z at the tier (h+1).

For example, when the variation degree "0" of the aforementioned combined group g1&g2 is less than v1, the label item corresponding to the combined character string "SHEET NAME&CREATION DATE" is arranged at the tier h. When the variation degree of the group g20 is equal to or more than v2 and less than v3, the label item corresponding to the character string "3. SCREEN EDITING" is arranged at the tier (h+2). For example, the character string "3. SCREEN EDITING" of the group g20 is a label item at a lower tier than the tier of the combined character string "SHEET NAME&CREATION DATE" of the combined group g1&g2.

When calculating the variation degree of the appearance positions, the generation unit 705 may detect an appearance position that is an outlier and calculate the variation degree by using the appearance positions other than the outlier. The generation unit 705 may calculate the variation degree by using the median value of the appearance positions, the trimmed mean thereof, or the like.

As the variation degree of the appearance positions of the character string, the variation degree only in one of the lateral direction (column direction) and the vertical direction (row direction) may be considered. For example, a certain type of design document has a tendency that even information at a conceptually high level has a large variation of the appearance positions in the vertical direction (row direction) while having only a small variation of the appearance positions in the lateral direction (column direction). In such a case, the generation unit 705 may consider the variation degree only in the lateral direction (column direction) as the variation degree of the appearance positions of the character string.

A linking relationship (parent-child relationship) between label items at adjacent tiers (between consecutive different tiers) among the label items L1 to Lm is determined based on, for example, the positional relationship in each design document di between the character strings corresponding to the respective label items Lj. Considered is a case of identifying a label item Lk (k≠j and k=1, 2, ..., m) at the tier h having a parent-child relationship with a label item Lj at the tier (h+1). The tier (h+1) is lower by one level than the tier h.

In this case, for example, in the design document di including the character string corresponding to the label item Lj, the generation unit 705 identifies the label item Lk corresponding to the character string closest to the appearance position of the character string corresponding to the label item Lj at the tier (h+1) among the character strings corresponding to the label items at the tier h.

As the appearance position of the character string, the appearance position of the character string in any of the design documents di including the character string may be used. As the appearance position of the character string, an average of the appearance positions of the character string in the respective design documents di including the character string may be used. Thus, the label items having the parent-child relationship may be identified in consideration of a difference among the appearance positions of each character string in the design documents di.

In Japanese design documents, it is often the case from experience that sentences are described from left to right and from top to bottom. Therefore, in the design document di, for example, information that is related to certain information A and that is at a level conceptually higher than the information A is often described in an upper left direction of the information A. Therefore, in the design document di including the character string corresponding to the label item Lj, the generation unit 705 may identify the label item Lk corresponding to the character string closest, in the upper left direction, to the appearance position of the character string corresponding to the label item Lj at the tier (h+1) among the character strings corresponding to the label items at the tier h.

Based on the determined tier of each label item Lj and the determined linking relationships between the label items, the generation unit 705 generates the system structure information in which the label items Lj of the label items L1 to Lm are hierarchized as the nodes with the linking relationships between the label items set as the edges. A specific example of the system structure information will be described later with reference to FIG. 11.

Figure 9:
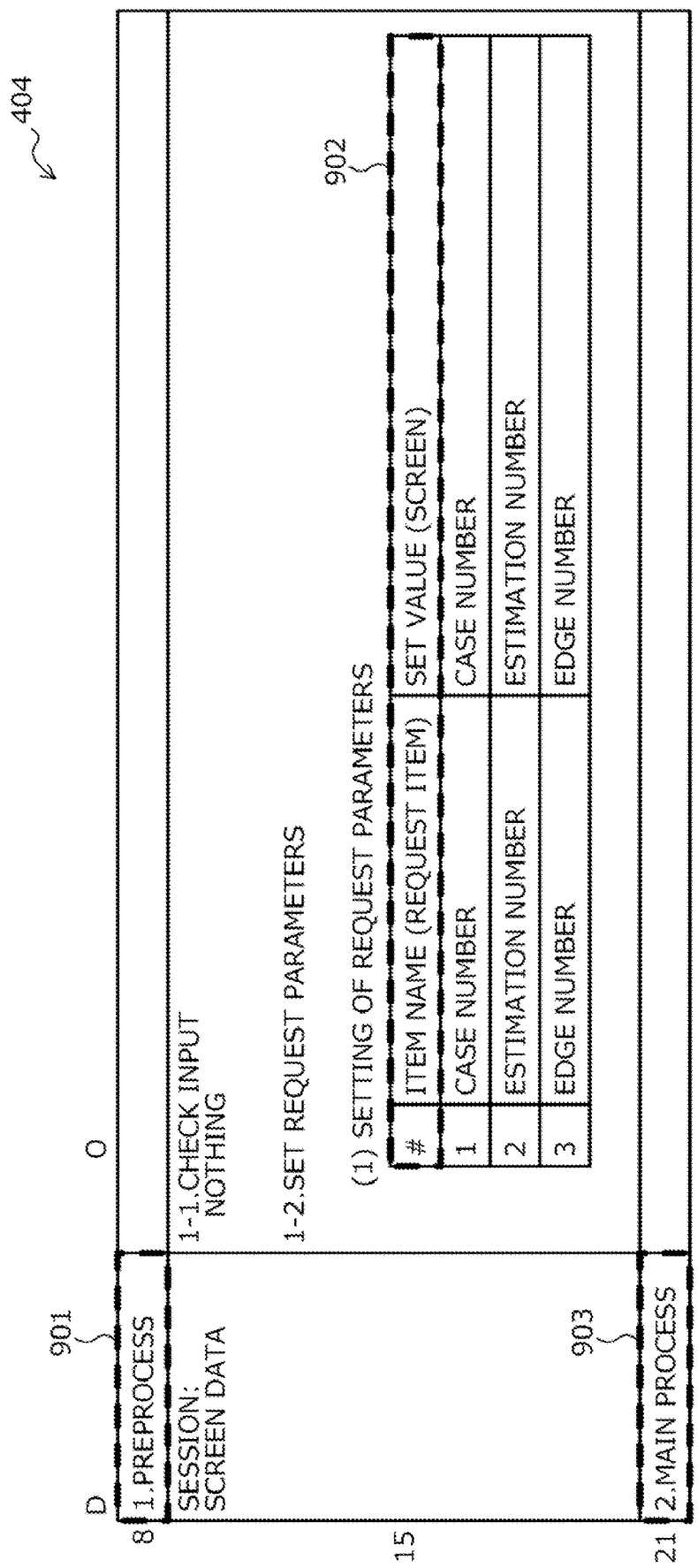
FIG. 9 is an explanatory diagram illustrating an example of identification of label items having a linking relationship between adjacent tiers.

With reference to FIG. 9, a specific example of identification of label items at adjacent tiers having a linking relationship (parent-child relationship) will be described.

FIG. 9 is an explanatory diagram illustrating a specific example of identification of label items at adjacent tiers having a linking relationship therebetween. FIG. 9 illustrates an extracted part of the design document 404. A character string "1. PREPROCESS" at an appearance position (D, 8), a combined character string "#&ITEM NAME (REQUEST ITEM)&SET VALUE (SCREEN)" at an appearance position (O, 15), and a character string "2. MAIN PROCESS" at an appearance position (D, 21) are identified as label items (see dotted line frames 901 to 903 in FIG. 9). The design document ID indicating the appearance position is omitted herein.

A tier to which a label item corresponding to the character string "1. PREPROCESS" belongs is a "tier 3", a tier to which a label item corresponding to the combined character string "#&ITEM NAME (REQUEST ITEM)&SET VALUE (SCREEN)" belongs is a "tier 4", and a tier to which a label item corresponding to the character string "2. MAIN PROCESS" belongs is a "tier 2".

In the design document 404, a distance between the character string "1. PREPROCESS" and the combined character string "#&ITEM NAME (REQUEST ITEM)&SET VALUE (SCREEN)" is, for example, 18 (=a difference in column+a difference in row). The distance between the character string "2. MAIN PROCESS" and the combined character string "#&ITEM NAME (REQUEST ITEM)&SET VALUE (SCREEN)" is, for example, 17 (=a difference in column+a difference in row).

The combined character string "#&ITEM NAME (REQUEST ITEM)&SET VALUE (SCREEN)" is information on the design of request parameters in "1. PREPROCESS". Therefore, it is preferable to set a linking relationship (parent-child relationship) between the label item corresponding to the combined character string "#&ITEM NAME (REQUEST ITEM)&SET VALUE (SCREEN)" and the label item corresponding to the character string "1. PREPROCESS".

For example, if the closest label item were simply identified, the label item corresponding to the character string "2. MAIN PROCESS" would be identified as the label item having the linking relationship with the label item corresponding to the combined character string "#&ITEM NAME (REQUEST ITEM)&SET VALUE (SCREEN)". On the other hand, if the label item closest in the upper left direction is identified, the label item corresponding to the character string "1. PREPROCESS" will be identified as the label item having the linking relationship with the label item corresponding to the combined character string "#&ITEM NAME (REQUEST ITEM)&SET VALUE (SCREEN)".

Returning to description of FIG. 7, the addition unit 706 adds information peculiar to a first label item to the first label item included in the generated system structure information. The first label item is any one of the label items L1 to Lm. The information peculiar to the first label item is information peculiar to the first label item in the design document di including the character string corresponding to the first label item. The information peculiar to the first label item is information that is not identified as the label items L1 to Lm.

For example, it is assumed that the character string corresponding to the first label item is a character string representing a table item. In this case, the information peculiar to the first label item is, for example, a character string indicating an item value of the table item. It is assumed that the character string corresponding to the first label item is a character string representing a process. In this case, the information peculiar to the first label item contains, for example, character strings indicating the processing details of the process.

For example, the addition unit 706 acquires the information peculiar to the first label item from the design document di based on the appearance position of the character string corresponding to the first label item in the design document di including the character string. For example, the addition unit 706 may acquire, as the information peculiar to the first label item, a character string that does not correspond to any of the label items L1 to Lm and that is the closest to the appearance position of the character string corresponding to the first label item from the design document di.

The addition unit 706 may select a label item corresponding to a combined character string as the first label item. An example of the combined character string identified as the first label item is a combination of item names (header character strings) of a table in the design document di. In this case, the information peculiar to the first label item is, for example, information on records in the table.

In the case of a table in which item names (header character strings) are arranged in the lateral direction, records are usually described under the item names. Therefore, when the combined character string corresponding to the first label item is a combination of character strings consecutive in the lateral direction, the addition unit 706 may acquire, as the peculiar information, information pieces (group of records) that consecutively appear under the combined character string corresponding to the first label item in the design document di including the combined character string concerned. The acquisition of the peculiar information is performed, for example, until a row in which all the cells are blank appears.

In the case of a table in which item names (header character strings) are arranged in the vertical direction, records are usually described on the right of the item names. Thus, when the combined character string corresponding to the first label item is a combination of character strings consecutive in the vertical direction, the addition unit 706 may acquire, as the peculiar information, information pieces (group of records) that appear consecutively on the right of the combined character string corresponding to the first label item in the design document di including the combined character string concerned. The acquisition of the peculiar information is performed, for example, until a column in which all the cells are blank appears.

An example of acquisition of the information peculiar to the first label item will be described with reference to FIG. 10.

FIG. 10 is an explanatory diagram illustrating an example of acquisition of the information peculiar to the first label item. FIG. 10 illustrates an extracted part of the design document 401. A combined character string "#&ITEM NAME (SCREEN)&SET VALUE (OUTPUT MESSAGE/FIXED VALUE)&ATTRIBUTE CONTROL" at the appearance position (K, 43) is selected as the first label item (see a dotted line frame 1001 in FIG. 10).

The combined character string "#&ITEM NAME (SCREEN)&SET VALUE (OUTPUT MESSAGE/FIXED VALUE)&ATTRIBUTE CONTROL" is a combination of character strings consecutive in the lateral direction. In this case, the addition unit 706 acquires, as the information peculiar to the first label item, a group of records 1002 to 1013 that appear consecutively under the combined character string.

The addition unit 706 may identify a range of the table from information such as ruled lines or a background color in the design document di (for example, the design document 401), and may acquire information (for example, the group of records 1002 to 1013) within the identified range as the information peculiar to the first label item.

Returning to description of FIG. 7, when generating the system structure information, the generation unit 705 may include a label item representing each design document di. In this case, for example, the generation unit 705 may generate the system structure information in which a label item representing each design document di is set as a label item at the uppermost tier (tier 1) and the hierarchized label items L1 to Lm are arranged right under the label item. In this generation, the generation unit 705 links the label item representing each design document di to the uppermost label item among the hierarchized label items L1 to Lm.

There is a case where each design document di of the design documents d1 to dn corresponds to one of sheets included in one file. In this case, for example, the generation unit 705 may set a label item representing a file including the design documents d1 to dn as a label item at the uppermost tier (tier 1) and set the label items representing the respective design documents di as the label items at the tier (tier 2) immediately under the uppermost tier. The generation unit 705 may generate the system structure information in which the hierarchized label items L1 to Lm are arranged right under the label item representing each design document di.

The output unit 707 outputs the generated system structure information. In a case where the peculiar information is added to the first label item, the output unit 707 outputs the system structure information including the peculiar information added to the first label item. An output form of the output unit 707 is to, for example, store it into the storage device such as the memory 302 or the disk 304, transmit it from the communication I/F 305 to another computer, display it on a display not illustrated, or output and print it with a printer not illustrated.

For example, the output unit 707 may display the system structure information on the client apparatus 202. To be more detail, for example, when displaying the system structure information, the output unit 707 displays the information peculiar to the first label item in association with the first label item. The information peculiar to the first label item is displayed, for example, as records in a table in which the first label item is set as the item names (header character strings).

In response to selection of the first label item included in the displayed system structure information, the output unit 707 may display the peculiar information added to the first label item. In this case, the information peculiar to the first label item may be displayed, for example, as records in a table in which the first label item is set as the item names (header character strings), or may be displayed in a pop-up window.

The system structure information enables a user (for example, a developer of the system) to recognize the structure of the system. For this reason, the system structure information is used, for example, as an overall design document of the system. The system structure information is used as information for creating an overall design document of the system.

The reception unit 708 receives a search string. The search string is a character string designated to search the system structure information for desired information. For example, when one desires to know a relationship between a certain process (or function) of the system and a database, the one designates a process name (or a function name) as a search string. For example, the reception unit 708 receives a search string from the client apparatus 202.

The search unit 709 refers to the generated system structure information and searches for a label item corresponding to the received search string. For example, with reference to the system structure information, the search unit 709 calculates a similarity between the search string and the character string corresponding to each label item Lj of the label items L1 to Lm. The search unit 709 searches for the label item with the highest similarity calculated among the label items L1 to Lm.

The output unit 707 outputs subtree information including the searched-out label item based on the generated system structure information. The subtree information is information representing a part of the hierarchized label items L1 to Lm (tree structure) and includes, for example, the searched-out label item and the label items thereunder.

For example, the output unit 707 displays the subtree information on the client apparatus 202 as a search result for the received search string. However, when the highest similarity is equal to or less than a predetermined value, the output unit 707 may output a search result indicating that there is no information corresponding to the search string.

Thus, for example, when the user designates a specific process name or a specific data name of the system as a search string, it is possible to extract, from the system structure information, information (subtree information) based on which it is possible to identify a relationship between elements concerning the specific process or the specific data.

The reception unit 708 may receive Src and Target as search strings. Src and Target are character strings for searching for information pieces to be associated with each other. For example, in order to associate a process with a table, a process name is designated as Src, and a character string indicating a table, a table acquisition item, or the like is designated as Target. For example, the reception unit 708 receives search strings (Src, Target) from the client apparatus 202.

The search unit 709 refers to the generated system structure information and searches for a label item corresponding to the received search string (Src). The search unit 709 refers to the generated system structure information and searches for a label item corresponding to the received search string (Target). In this search, the search unit 709 searches, for example, the label items under the searched-out label item corresponding to the search string (Src) to find the label item corresponding to the search string (Target).

Then, the search unit 709 acquires, from the system structure information, target information including a label item immediately under the searched-out label item corresponding to the search string (Target). The target information includes, for example, the peculiar information added to the label item immediately under the label item corresponding to the search string (Target). A specific example of the target information will be described later with reference to FIG. 18.

The output unit 707 outputs the acquired target information in association with the searched-out label item corresponding to the search string (Src). The output unit 707 may output the acquired target information in association with the search string (Src).

There is a case where any label item is not present immediately under the label item corresponding to the search string (Target). In this case, for example, the output unit 707 may output target information including the peculiar information added to the label item corresponding to the search string (Target) in association with the label item corresponding to the search string (Src).

The functional units of the design document management server 201 described above may be implemented by multiple computers (for example, the design document management server 201 and the client apparatus 202) in the information processing system 200.

(Specific Example of System Structure Information)

Next, with reference to FIG. 11, description will be given of a specific example of the system structure information generated based on the design documents d1 to dn (for example, the design documents 401 to 404) about the system.

Figure 11:
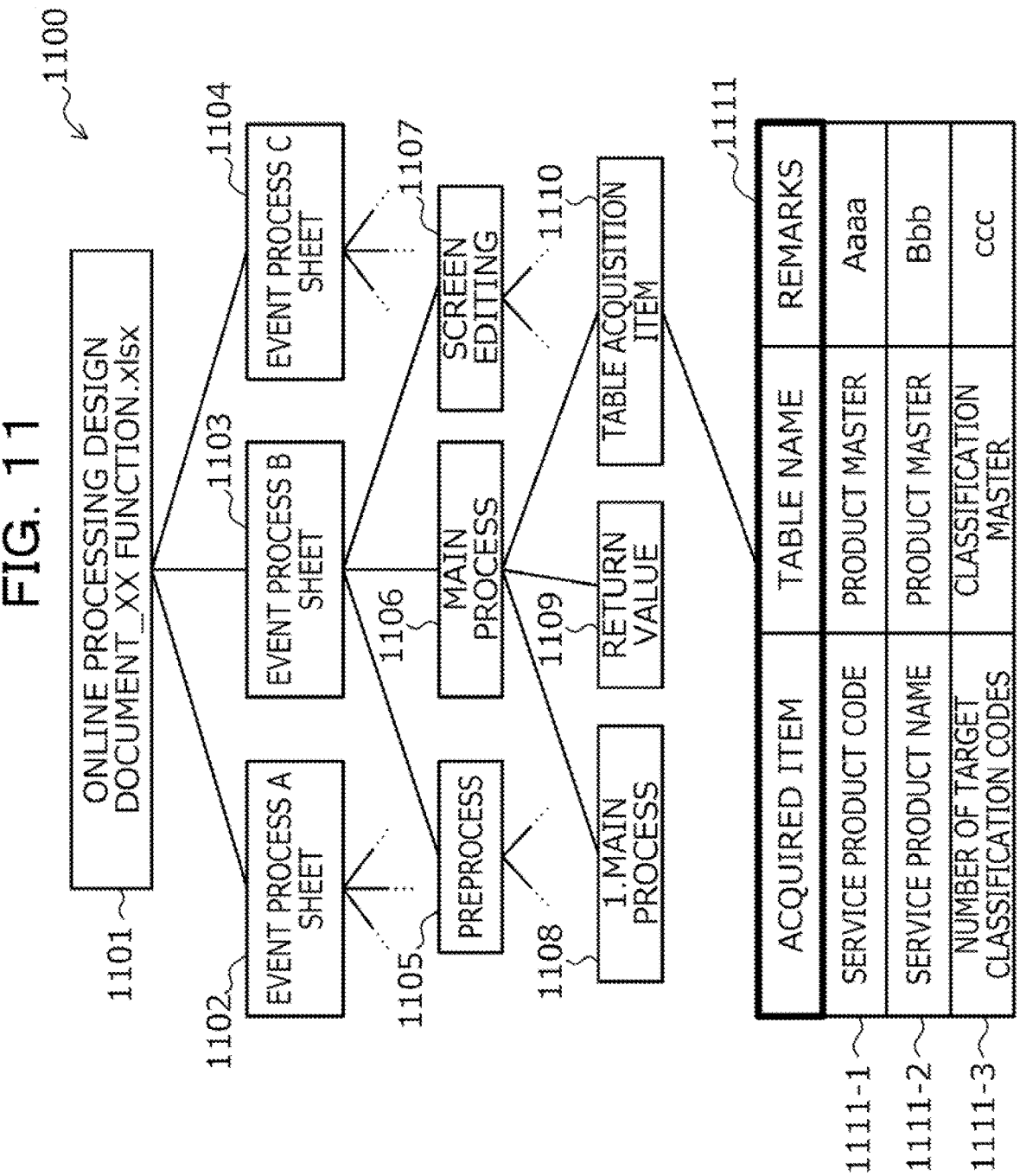
FIG. 11 is an explanatory diagram illustrating a specific example of system structure information.

FIG. 11 is an explanatory diagram illustrating a specific example of system structure information. In FIG. 11, system structure information 1100 is tree structure information in which multiple label items (for example, label items 1101 to 1111) are hierarchized. FIG. 11 illustrates an extracted part of the system structure information 1100.

The label item 1101 is a label item corresponding to a file including each design document di of the design documents d1 to dn as a sheet. The label items 1102 to 1104 are label items corresponding to the respective sheets (the respective design documents di) included in the file. The label items 1105 to 1111 under the label item 1103 are equivalent to the hierarchized label items L1 to Lm extracted from the design documents d1 to dn.

The label item 1111 corresponds to a combined character string that is a combination of a character string "ACQUIRED ITEM", a character string "TABLE NAME", and a character string "REMARKS". Peculiar information 1111-1 to 1111-3 is added to the label item 1111. The peculiar information 1111-1 to 1111-3 is acquired as information peculiar to the label item 1111, and is equivalent to records in a table having the items of "ACQUIRED ITEM", "TABLE NAME", and "REMARKS".

Although not illustrated, also under each of the label items 1102 and 1104, the label items 1105 to 1111 are arranged and the peculiar information 1111-1 to 1111-3 is added to the label item 1111 in the same manner as under the label item 1103.

The system structure information 1100 allows the user to easily recognize the structure of the system. For example, the user may recognize that processing for an event process B includes a preprocess, a main process, and screen editing. Thus, for example, when the event process B is changed due to a modification of the system, the user may determine that the preprocess, the main process, and the screen editing are included in the influence range. The user may recognize which information in which table is to be accessed in the main process from the peculiar information 1111-1 to 1111-3 added to the label item 1111.

(Various Process Procedures of Design Document Management Server 201)

Next, various process procedures of the design document management server 201 will be described. First, a design document management process procedure of the design document management server 201 will be described with reference to FIG. 12.

Figure 12:
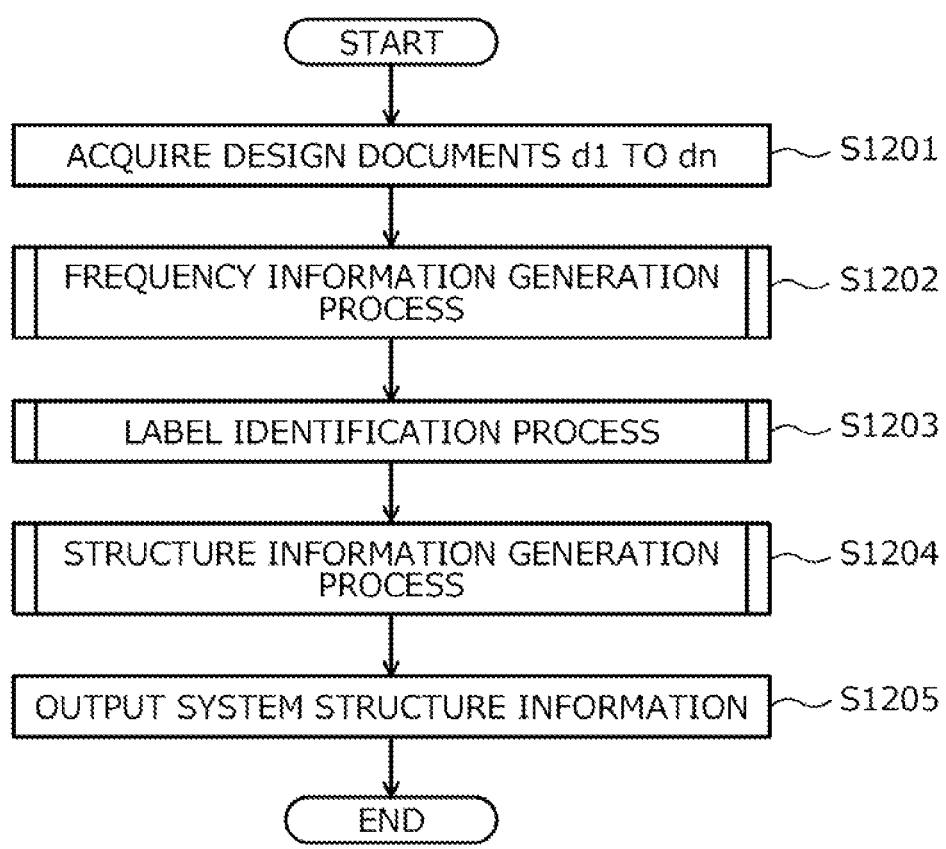
FIG. 12 is a flowchart illustrating an example of a design document management process procedure of the design document management server.

FIG. 12 is a flowchart illustrating an example of the design document management process procedure of the design document management server 201. In the flowchart of FIG. 12, first, the design document management server 201 acquires the design documents d1 to dn about the system (step S1201). Next, the design document management server 201 executes a frequency information generation process based on the acquired design documents d1 to dn (step S1202).

The frequency information generation process is a process of generating appearance frequency information of character strings included in the design documents d1 to dn. The character strings include character strings at cells in each design document di and combined character strings in each of which character strings at adjacent cells (in p adjacencies) in each design document di are concatenated together. A specific process procedure of the frequency information generation process will be described later with reference to FIG. 13.

Next, the design document management server 201 executes a label identification process based on the generated appearance frequency information of the character strings (step S1203). The label identification process is a process of identifying the label items L1 to Lm each representing an element of the system. A specific process procedure of the label identification process will be described later with reference to FIG. 14.

Next, the design document management server 201 executes a structure information generation process based on the appearance positions of the character string corresponding to each label item Lj of the identified label items L1 to Lm in the design documents d1 to dn (step S1204). The structure information generation process is a process of generating system structure information in which the label items L1 to Lm are hierarchized. A specific process procedure of the structure information generation process will be described later with reference to FIG. 15.

The design document management server 201 outputs the generated system structure information (step S1205), and ends the series of processes according to the flowchart.

Thus, the design document management server 201 is capable of automatically generating information expressing the structure of the system (system structure information) from the design documents d1 to dn about the system.

Next, the specific process procedure of the frequency information generation process in step S1202 illustrated in FIG. 12 will be described with reference to FIG. 13.

Figure 13:
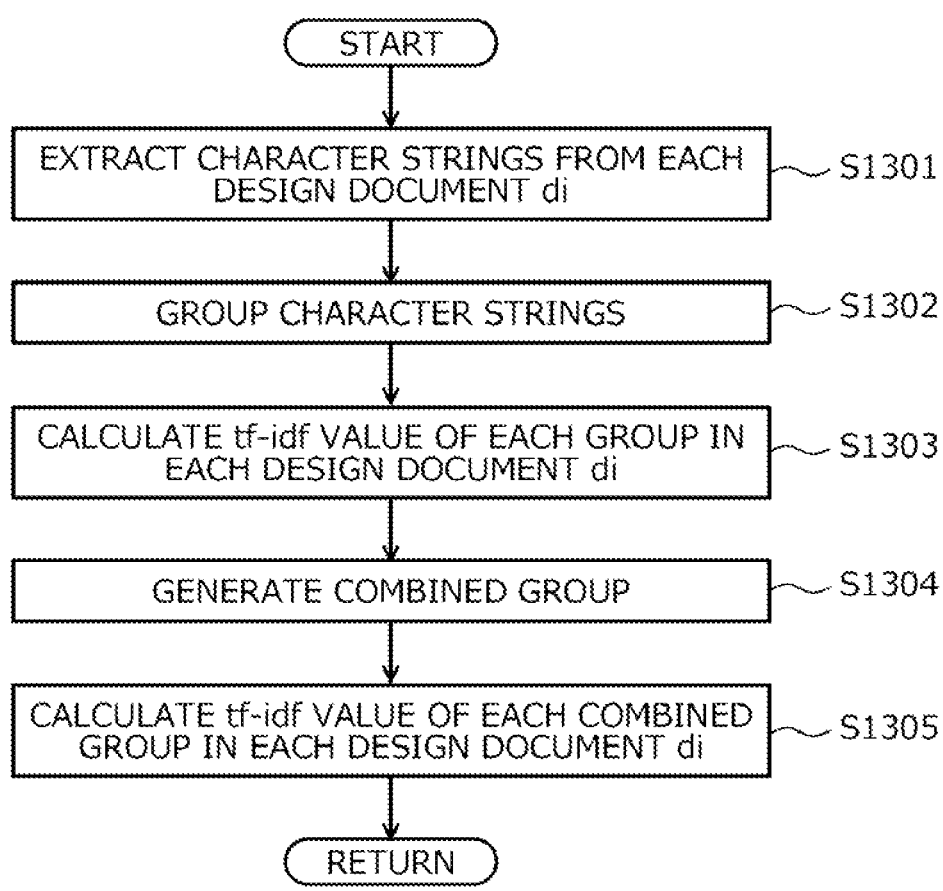
FIG. 13 is a flowchart illustrating an example of a specific process procedure of a frequency information generation process.

FIG. 13 is a flowchart illustrating an example of a specific process procedure of the frequency information generation process. In the flowchart of FIG. 13, first, the design document management server 201 extracts character strings from each design document di (step S1301). The extracted character strings are, for example, character strings at the cells in the design document di.

Next, the design document management server 201 groups the extracted character strings (step S1302). The design document management server 201 calculates the tf-idf value in each design document di for each of the groups formed by grouping the character strings (step S1303). The tf-idf value in each design document di for each group is stored, for example, in the appearance frequency information table 240.

Next, the design document management server 201 generates combined groups (step S1304). Each of the combined groups corresponds to a combined character string in which character strings at adjacent cells in each design document di are concatenated together (character strings in at most p adjacencies are concatenated), and is a combination of groups to which the respective character strings included in the combined character string belong.

The design document management server 201 calculates the tf-idf value in each design document di for each of the generated combined groups (step S1305), and returns to the step of invoking the frequency information generation process. The calculated tf-idf value in each design document di for each combined group is stored, for example, in the appearance frequency information table 240.

In this way, the design document management server 201 is capable of generating the appearance frequency information of the character strings (character strings at the cells or combined character strings in each of which character strings at cells in at most p adjacencies are concatenated) included in the design documents d1 to dn.

Next, a specific process procedure of the label identification process in step S1203 illustrated in FIG. 12 will be described with reference to FIG. 14.

Figure 14:
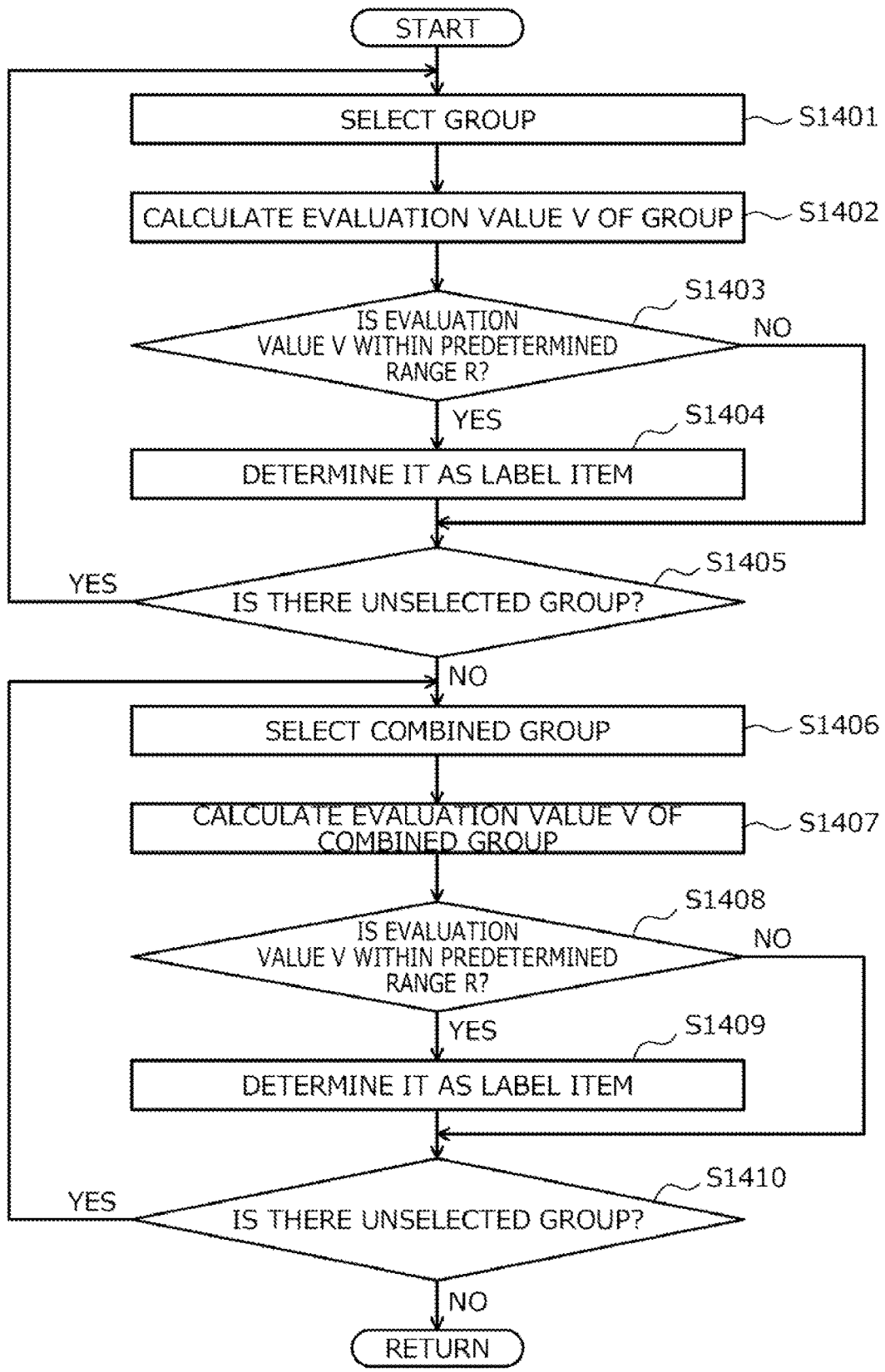
FIG. 14 is a flowchart illustrating an example of a specific process procedure of a label identification process.

FIG. 14 is a flowchart illustrating an example of a specific process procedure of the label identification process. In the flowchart of FIG. 14, the design document management server 201 first selects an unselected group among the formed groups (step S1401). Next, the design document management server 201 calculates an evaluation value V of the selected group with reference to the appearance frequency information table 240 (step S1402).

The evaluation value V of the group indicates how likely the character string of the group is to be universal information in the design documents d1 to dn. The evaluation value V of the group is calculated, for example, by adding up the tf-idf values of the group in the design documents d1 to dn.

The design document management server 201 determines whether the calculated evaluation value V is within a predetermined range R (step S1403). When the evaluation value V is not within the predetermined range R (step S1403: No), the design document management server 201 proceeds to step S1405.

On the other hand, when the evaluation value V is within the predetermined range R (step S1403: Yes), the design document management server 201 identifies the character string of the selected group as a label item (step S1404). Then, the design document management server 201 determines whether there is an unselected group among the formed groups (step S1405).

When there is an unselected group (step S1405: Yes), the design document management server 201 returns to step S1401. On the other hand, when there is no unselected group (step S1405: No), the design document management server 201 selects an unselected combined group from the generated combined groups (step S1406).

Next, the design document management server 201 calculates the evaluation value V of the selected combined group with reference to the appearance frequency information table 240 (step S1407). The evaluation value V of the combined group indicates how likely the combined character string of the combined group is to be universal information in the design documents d1 to dn. The evaluation value V of the combined group is calculated, for example, by adding up the tf-idf values of the combined group in the design documents d1 to dn.

The design document management server 201 determines whether the calculated evaluation value V is within the predetermined range R (step S1408). When the evaluation value V is not within the predetermined range R (step S1408: No), the design document management server 201 proceeds to step S1410.

On the other hand, when the evaluation value V is within the predetermined range R (step S1408: Yes), the design document management server 201 identifies the combined character string of the selected combined group as a label item (step S1409). Then, the design document management server 201 determines whether or not there is an unselected combined group among the generated combined groups (step S1410).

When there is an unselected combined group (step S1410: Yes), the design document management server 201 returns to step S1406. On the other hand, when there is no unselected combined group (step S1410: No), the design document management server 201 returns to the step of invoking the label identification process.

In this way, the design document management server 201 is capable of identifying universal information (character strings and combined character strings) in the design documents d1 to dn as label items.

Next, a specific process procedure of the structure information generation process in step S1204 illustrated in FIG. 12 will be described with reference to FIG. 15.

Figure 15:
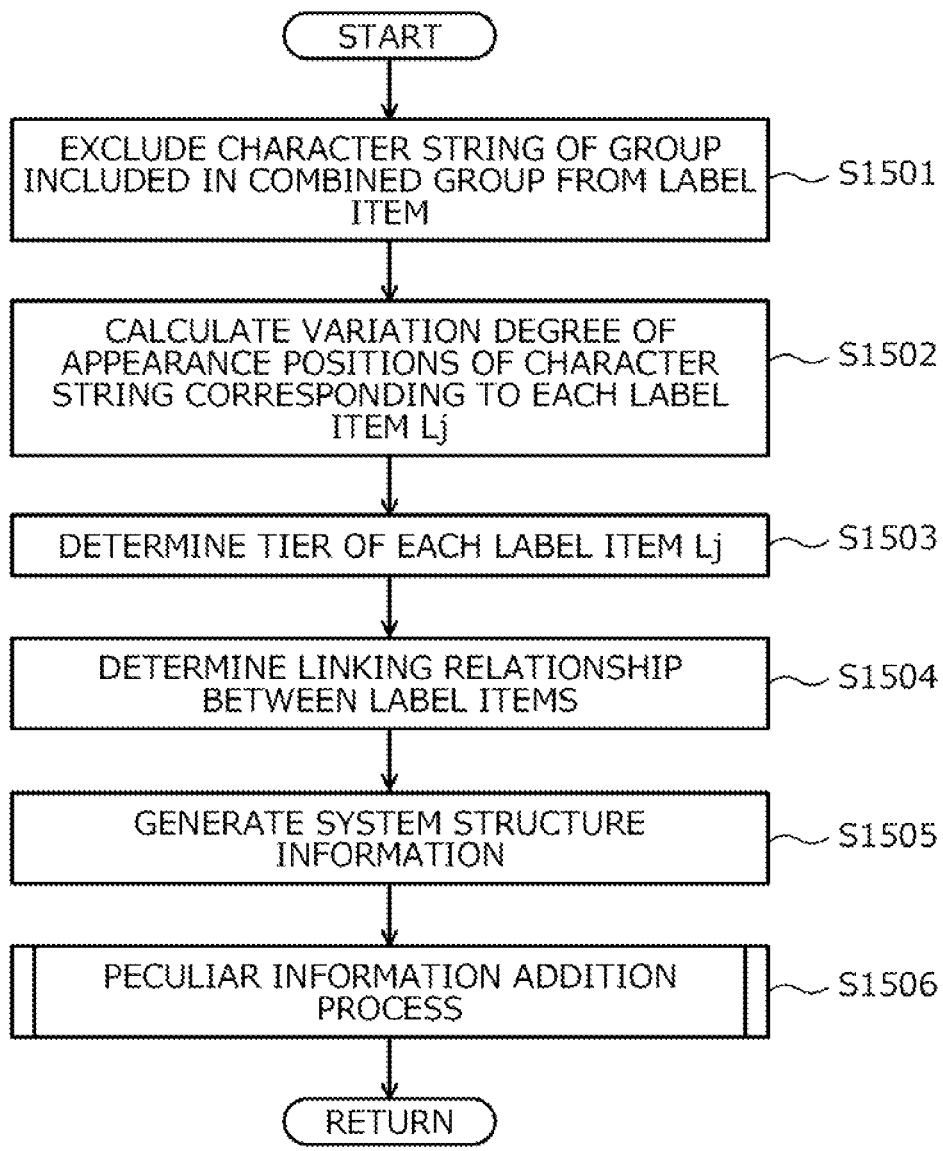
FIG. 15 is a flowchart illustrating an example of a specific process procedure of a structure information generation process.

FIG. 15 is a flowchart illustrating an example of a specific process procedure of the structure information generation process. In the flowchart of FIG. 15, first, the design document management server 201 excludes, from the label items, the character strings of the groups included in the combined groups (step S1501). The multiple label items excluding the character strings of the groups included in the combined groups are referred to as "label items L1 to Lm" herein.

Next, the design document management server 201 calculates a variation degree of the appearance positions of the character string corresponding to each label item Lj in the design documents d1 to dn based on the appearance positions of the character string in the design documents di including the character string corresponding to each label item Lj (step S1502).

The design document management server 201 determines a tier of each label item Lj based on the calculated variation degree (step S1503). Which tier each label item Lj is to belong to is determined based on, for example, a variation degree range for each tier set in advance.

Next, the design document management server 201 determines a linking relationship between the label items at adjacent tiers among the label items L1 to Lm based on the positional relationship in each design document di between the character strings corresponding to the respective label items Lj (step S1504).

The design document management server 201 generates the system structure information based on the determined tiers of the label items Lj and the determined linking relationships between the label items (step S1505). The system structure information is tree structure data in which the label items Lj of the label items L1 to Lm are hierarchized as nodes with the linking relationships between the label items set as edges.

Next, the design document management server 201 executes a peculiar information addition process of adding peculiar information to the label item Lj (step S1506), and returns to the step of invoking the structure information generation process. A specific process procedure of the peculiar information addition process will be described later with reference to FIG. 16.

Thus, the design document management server 201 is capable of generating the system structure information in which the label items Lj representing the elements of the system are hierarchized as the nodes with the linking relationships between the label items set as the edges. In a case where the peculiar information is not added to the label item Lj, the design document management server 201 skips the process in step S1506.

Next, a specific process procedure of the peculiar information addition process in step S1506 illustrated in FIG. 15 will be described with reference to FIG. 16. Description will be given for an example case where a label item corresponding to a combined character string is set as a label item (first label item) to which peculiar information is added.

Figure 16:
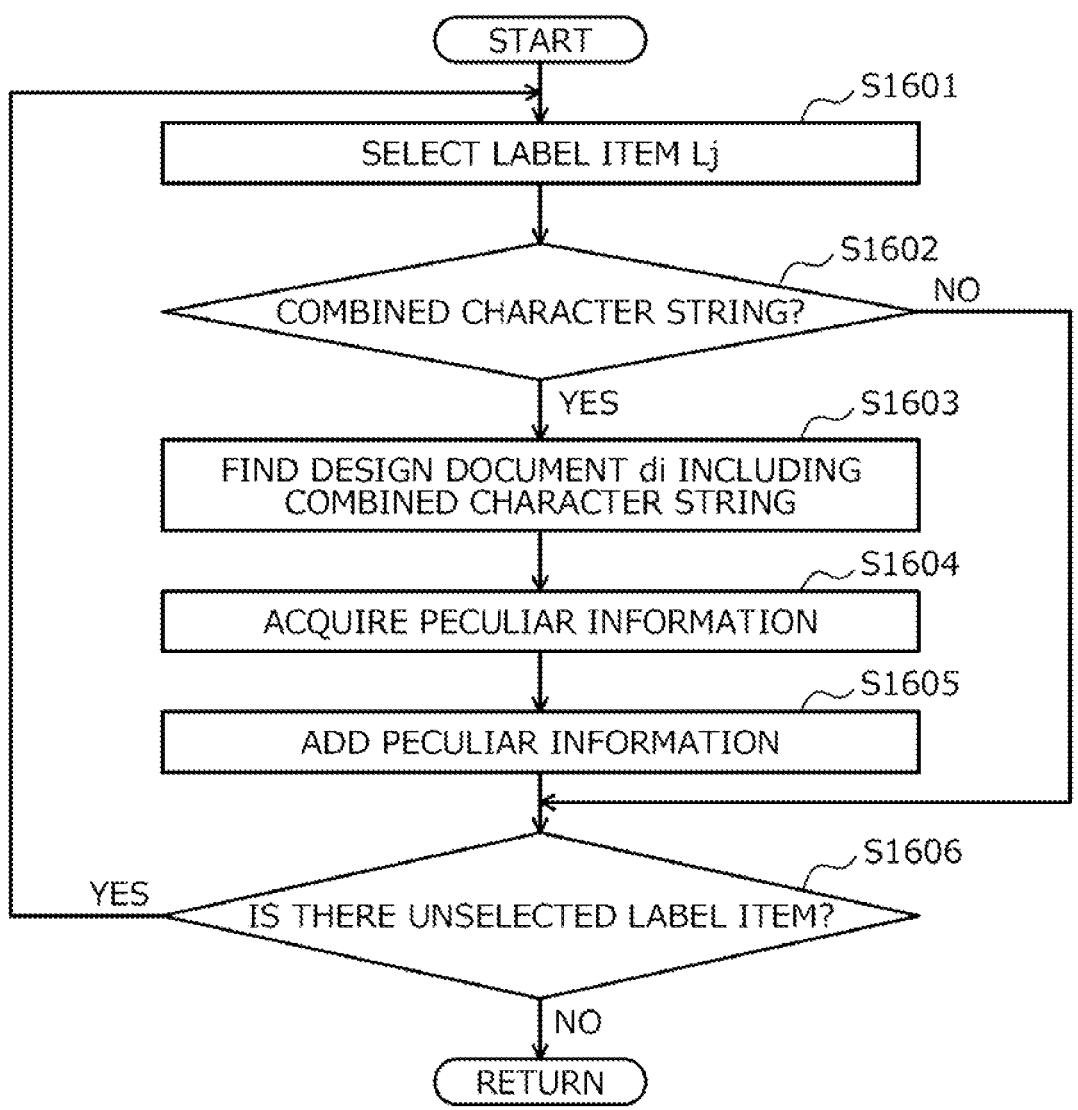
FIG. 16 is a flowchart illustrating an example of a specific process procedure of a peculiar information addition process.

FIG. 16 is a flowchart illustrating an example of a specific process procedure of the peculiar information addition process. In the flowchart of FIG. 16, first, the design document management server 201 selects an unselected label item Lj from the label items L1 to Lm (step S1601). The design document management server 201 determines whether the label item Lj is a label item corresponding to a combined character string (step S1602).

When the label item does not correspond to the combined character string (step S1602: No), the design document management server 201 proceeds to step S1606. On the other hand, when the label item corresponds to the combined character string (step S1602: Yes), the design document management server 201 identifies a design document di including the combined character string corresponding to the label item Lj from among the design documents d1 to dn (step S1603).

Next, the design document management server 201 acquires the information peculiar to the label item Lj from the identified design document di based on the appearance position of the combined character string in the identified design document di (step S1604). The design document management server 201 adds the acquired peculiar information to the label item Lj included in the generated system structure information (step S1605).

When the peculiar information is not acquired in step S1604, the design document management server 201 skips step S1605. When multiple design documents di including the combined character string corresponding to the label item Lj are identified in step S1603, for example, multiple pieces of information peculiar to the label item Lj are acquired. In this case, the design document management server 201 adds the acquired multiple pieces of peculiar information to the label item Lj.

Next, the design document management server 201 determines whether there is an unselected label item that is yet to be selected from the label items L1 to Lm (step S1606). When there is an unselected label item (step S1606: Yes), the design document management server 201 returns to step S1601.

On the other hand, when there is no unselected label item (step S1606: No), the design document management server 201 returns to the step of invoking the peculiar information addition process.

In this way, the design document management server 201 is capable of adding, to the label item Lj corresponding to the combined character string included in the system structure information, for example, the information peculiar to the label item Lj such as records in the table.

Next, an information association process procedure of the design document management server 201 will be described with reference to FIG. 17. The information association process is a process for associating information by using system structure information generated in the design document management server 201.

Figure 17:
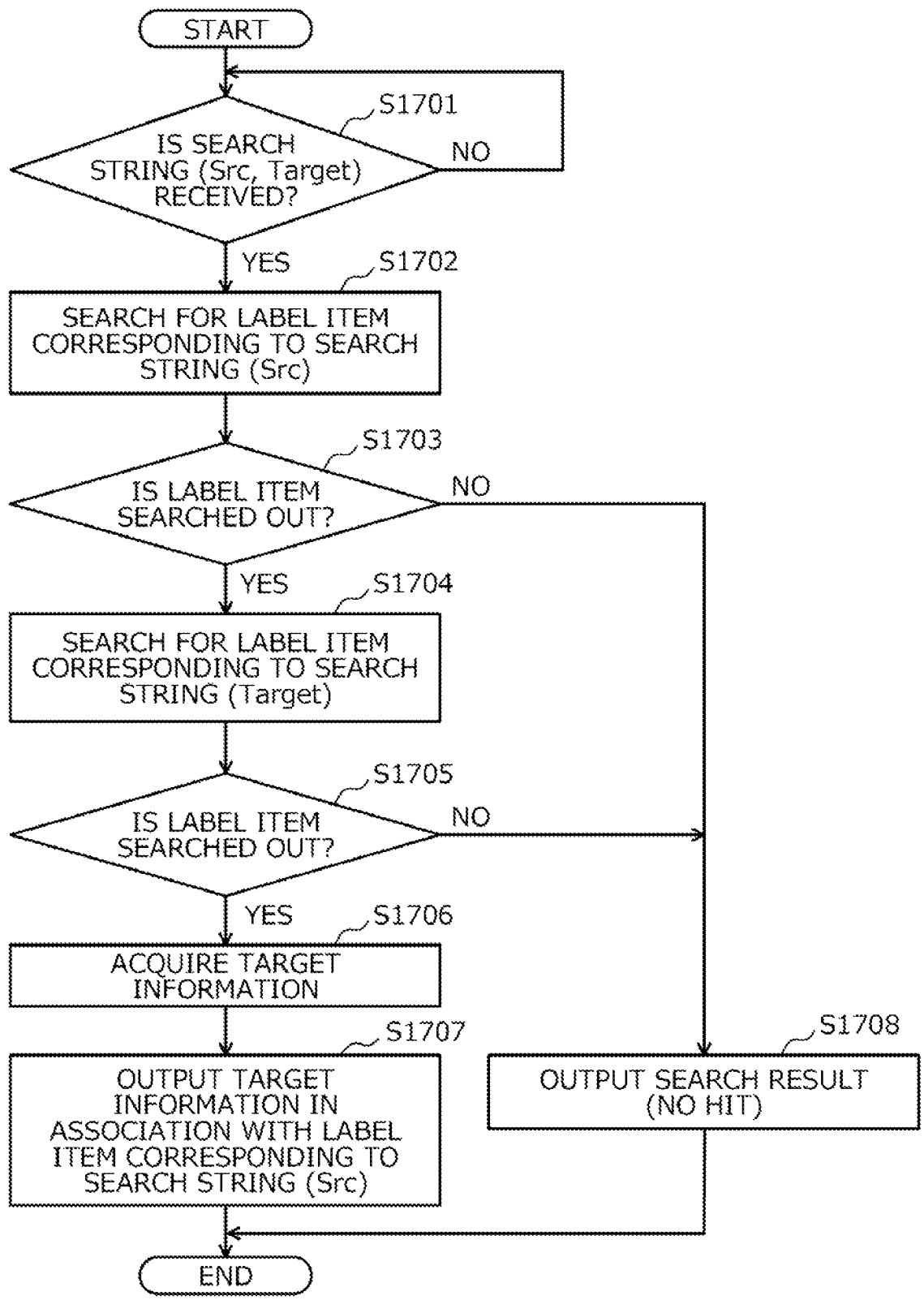
FIG. 17 is a flowchart illustrating an example of an information association process procedure of the design document management server.

FIG. 17 is a flowchart illustrating an example of an information association process procedure of the design document management server 201. In the flowchart of FIG.

17, first, the design document management server 201 determines whether or not search strings (Src, Target) are received (step S1701). The design document management server 201 waits to receive the search strings (Src, Target) (step S1701: No).

When the search strings (Src, Target) are received (step S1701: Yes), the design document management server 201 refers to the system structure information and searches for a label item corresponding to the received search string (Src) (step S1702). The design document management server 201 determines whether the label item is searched out (step S1703).

When the label item is not searched out (step S1703: No), the design document management server 201 proceeds to step S1708. On the other hand, when the label item is searched out (step S1703: Yes), the design document management server 201 refers to the system structure information and searches for a label item corresponding to the received search string (Target) (step S1704).

Next, the design document management server 201 determines whether or not the label item is searched out (step S1705). When the label item is searched out (step S1705: Yes), the design document management server 201 acquires, from the system structure information, target information including a label item immediately under the searched-out label item corresponding to the search string (Target) and the peculiar information added to the label item (step S1706).

The design document management server 201 outputs the acquired target information in association with the searched-out label item corresponding to the search string (Src) (step S1707), and ends the series of processing according to this flowchart.

When the label item is not searched out in step S1705 (step S1705: No), the design document management server 201 outputs a search result (no hit) indicating that the corresponding information is not searched out (step S1708), and ends the series of processing according to this flowchart.

Thus, the design document management server 201 is capable of making associations between the designated Src and Target, such as an association between processes in the system, an association between a process and data in the system, and an association between data in the system.

The information association process described above may be executed by, for example, a computer (for example, the client apparatus 202) different from the design document management server 201.

(Specific Example of Target Information)

Next, a specific example of the target information will be described with reference to FIG. 18. The target information is output in association with the label item corresponding to the search string (Src) in step S1707 illustrated in FIG. 17, for example.

Figure 18:
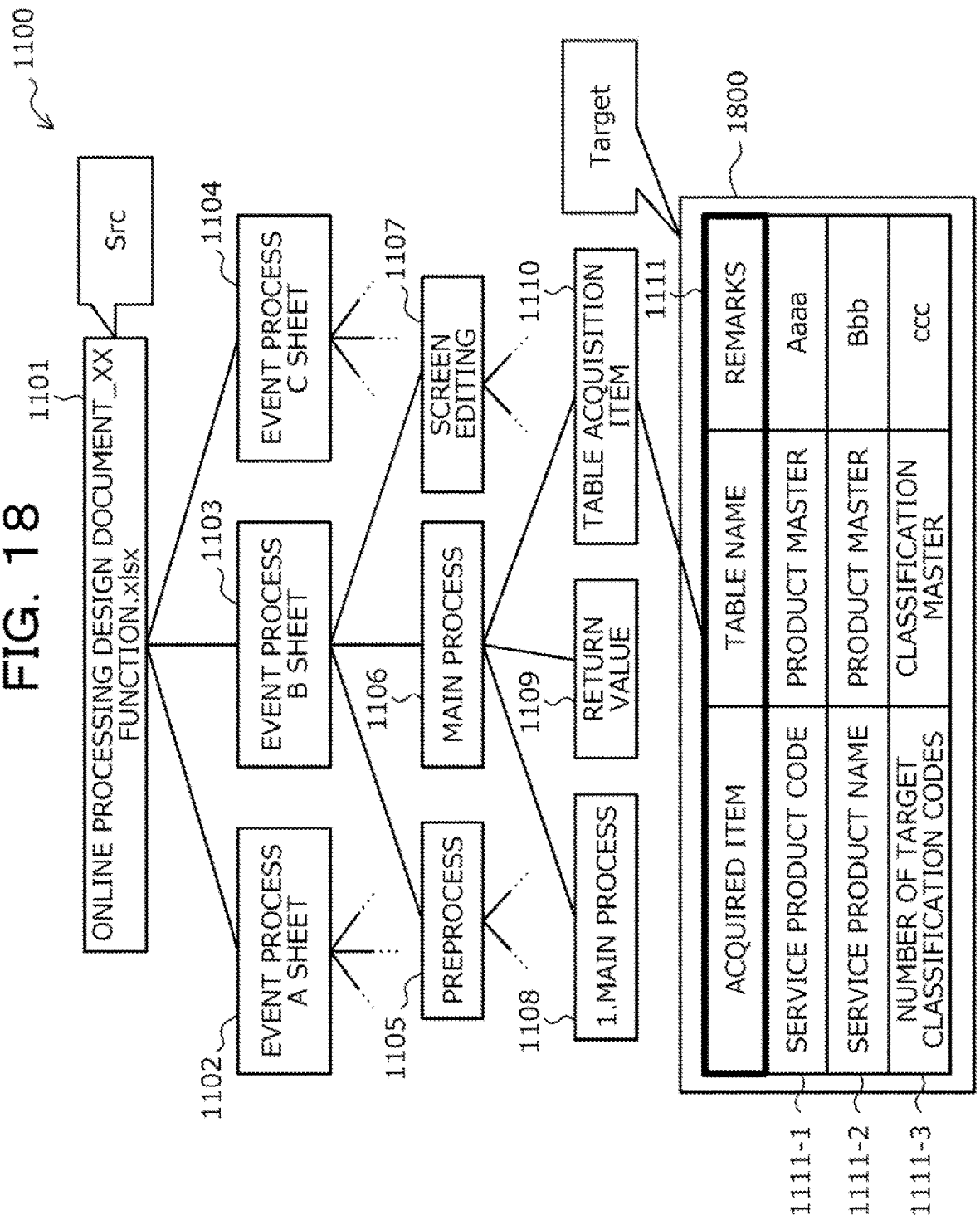
FIG. 18 is an explanatory diagram illustrating a specific example of target information.

FIG. 18 is an explanatory diagram illustrating a specific example of the target information. In FIG. 18, the system structure information 1100 is tree structure information in which multiple label items (for example, the label items 1101 to 1111) are hierarchized. FIG. 18 illustrates an extracted part of the system structure information 1100.

It is assumed that (XX function, table acquisition item) are received as the search strings (Src, Target). In this case, the design document management server 201 refers to the system structure information 1100 to search for a label item corresponding to the search string (Src: XX function). It is assumed that the label item 1101 is searched out.

The design document management server 201 refers to the system structure information 1100 to search for a label item corresponding to the search string (Target: table acquisition item). It is assumed that the label item 1110 is searched out. In this case, the design document management server 201 acquires target information 1800 including the label item 1111 immediately under the searched-out label item 1110 and the peculiar information 1111-1 to 1111-3 added to the label item 1111 from the system structure information 1100.

The design document management server 201 outputs the acquired target information 1800 in association with the label item 1101 corresponding to the search string (Src). Thus, the user is enabled to identify the data to be used in the XX function by simply designating Src (XX function) and Target (table acquisition item).

As described above, the design document management server 201 according to the embodiment acquires the design documents d1 to dn about the system, and identifies the label items L1 to Lm representing the elements of the system based on the appearance frequency information of the character strings included in the acquired design documents d1 to dn. Each design document di is, for example, a design document in a grid paper format. Each of the character strings included in the design documents d1 to dn is, for example, at least any of a character string at a cell in each design document di, and a combined character string in which character strings at adjacent cells in each design document di are concatenated. The design document management server 201 generates the system structure information in which the identified label items L1 to Lm are hierarchized based on the appearance positions at which the character string corresponding to each label item Lj of the label items L1 to Lm appears in the design documents d1 to dn.

Accordingly, the design document management server 201 is capable of extracting elements that constitute the system from the design documents d1 to dn about the system, and automatically generating information expressing the structure of the system (system structure information). For example, the design document management server 201 is capable of expressing elements such as functions, processes, data, and databases in the system as hierarchized in a tree form. This makes it easy for the user to recognize the relationships between the elements in the system and, for example, identify an influence range due to a modification of the system.

The design document management server 201 calculates evaluation values V each indicating how likely a character string is to be universal information in the design documents d1 to dn based on the appearance frequency of the character string in each design document di and the ratio of design documents including the character string among the design documents d1 to dn, and identifies the label items L1 to Lm based on the calculated evaluation values V. For example, the design document management server 201 calculates the evaluation value V by adding up the tf-idf values of the character string in the design documents d1 to dn, and identifies, as each label item Lj of the label items L1 to Lm, a character string having the calculated evaluation value V within the predetermined range R.

Accordingly, the design document management server 201 is capable of labeling, as a character string representing an element of the system, a character string (character string with low peculiarity) that appears in all the design documents d1 to dn and is not information peculiar to a specific design document.

The design document management server 201 calculates a variation degree of the appearance positions of a character string corresponding to each label item Lj in the design documents d1 to dn based on the appearance position of the character string in each design document di including the character string. The design document management server 201 generates the system structure information based on the calculated variation degree of the appearance positions of the character string and the positional relationship in each design document di between the character strings corresponding to the respective label items Lj.

Accordingly, the design document management server 201 is capable of determining the tier where to arrange each label item Lj by using a tendency that information at a conceptually higher level has a smaller variation among the appearance positions in the design documents di. For example, a label item representing an abstract process may be arranged at a higher level than a label item representing a specific process by using the tendency that the abstract process has a smaller positional variation than that of the specific process. A label item representing a process to access data may be arranged at a higher level than a label item representing the data by using the tendency that the process has a smaller positional variation than that of the data.

The design document management server 201 acquires the information peculiar to a first label item among the label items L1 to Lm from each design document di including a character string corresponding to the first label item, based on the appearance position of the character string in the design document di. The design document management server 201 adds the acquired peculiar information to the first label item included in the generated system structure information.

Thus, the design document management server 201 may extract, from the design document di, information peculiar to the label item Lj, such as an initial value and execution conditions of a process represented by the label item Lj, and a value of a data item represented by the label item Lj, and add the extracted peculiar information to the label item Lj.

The design document management server 201 selects a first label item corresponding to a combined character string from the label items L1 to Lm. When the combined character string corresponding to the first label item is a combination of character strings consecutive in the lateral direction, the design document management server 201 acquires, from the design document di including the combined character string corresponding to the first label item, information that appears consecutively under the combined character string in the design document di, as the information peculiar to the first label item. When the combined character string corresponding to the first label item is a combination of character strings consecutive in the vertical direction, the design document management server 201 acquires, from the design document di including the combined character string corresponding to the first label item, information that appears consecutively on the right of the combined character string, as the information peculiar to the first label item.

Accordingly, when the first label item represents a combination of items in a table, the design document management server 201 is capable of accurately extracting a group of records in the table and adding the group of records as the information peculiar to the first label item. By referring to the peculiar information added to the first label item, the user may easily recognize which process is to access which data.

The design document management server 201 receives a search string, refers to the generated system structure information to search for a label item corresponding to the received search string, and outputs subtree information including the searched-out label item based on the system structure information. The subtree information includes, for example, the label item corresponding to the search string and label items thereunder among the hierarchized label items L1 to Lm.

Thus, for example, when the user designates a specific process name or a specific data name of the system as a search string, it is possible to extract, from the system structure information, information (subtree information) based on which it is possible to identify a relationship between elements concerning the specific process or the specific data.

The design document management server 201 receives the search strings (Src, Target), and refers to the generated system structure information to search for a label item corresponding to the received search string (Src) and a label item corresponding to the received search string (Target). The design document management server 201 acquires target information including a label item immediately under the searched-out label item corresponding to the search string (Target) from the system structure information, and outputs the acquired target information in association with the label item corresponding to the search string (Src).

Accordingly, the design document management server 201 is capable of making an association between the designated Src and Target, such as an association between processes in the system, an association between a process and data in the system, and an association between data in the system.

From the above, with the design document management server 201 (information processing apparatus 101) according to the embodiment, it is possible to obtain the structure information of the system from the design documents d1 to dn without strictly defining the formats of the design documents. The structure information of the system may be used as an overall design document or may be used as information for creating an overall design document. Therefore, for example, every time the system is modified, one does not have to manually check all the design documents d1 to dn and reflect the influence of the modification to the overall design document. Thus, it is possible to reduce operation loads and operation time of developers and the like. The design document management method discussed herein is effective, for example, in a case where multiple design documents are written in formats somewhat similar to each other without having strictly-determined description rules (for example, what information is input to each field).

The design document management method described in this embodiment may be implemented by executing a program prepared in advance on a computer such as a personal computer or a workstation. The design document management program is recorded on a computer-readable recording medium such as a hard disk, a flexible disk, a CD-ROM, a DVD, or a USB memory and is executed by being read by the computer from the recording medium. The design document management program may also be distributed via a network such as the Internet.

The design document management server 201 (information processing apparatus 101) described in the embodiment may also be achieved with an IC for a specific application such as a standard cell or a structured application-specific integrated circuit (ASIC), or with a programmable logic device (PLD) such as a field-programmable gate array (FPGA).

Regarding the above-described embodiment, the following supplementary notes are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a design document management program, the program causing a computer to execute a process comprising:
   acquiring a plurality of design documents about a system;
   identifying a plurality of label items representing elements of the system based on appearance frequency information of character strings included in the plurality of design documents acquired; and
   generating structure information in which the plurality of label items are hierarchized based on appearance positions at which the character string corresponding to each of the plurality of label items identified appears in the plurality of design documents,
   wherein the generating includes
   calculating a variation degree, which indicates a sum of a sample variance in a lateral direction and a sample variance in a vertical direction, of the appearance positions of the character string corresponding to each of the label items in the plurality of design documents based on the appearance positions of the character string in the design documents including the character string, and
   generating the structure information based on the calculated variation degree of the appearance positions of the character string and a positional relationship between the character strings corresponding to the respective label items in each of the design documents,
   wherein
   each of the plurality of design documents is a design document in a grid paper format, and
   each of the character strings included in the plurality of design documents is at least any of a character string at a cell in each of the design documents and a combined character string in which character strings at adjacent cells in each of the design documents are concatenated,
   wherein the program causes the computer to execute a process including
   selecting a first label item corresponding to a combined character string from the plurality of label items,
   when the combined character string corresponding to the first label item is a combination of character strings consecutive in the lateral direction, acquiring, from a design document including the combined character string corresponding to the first label item, information that appears consecutively under the combined character string in the design document, as information peculiar to the first label item, and
   adding the acquired peculiar information to the first label item included in the generated structure information,
   wherein the acquiring the peculiar information includes
   when the combined character string corresponding to the first label item is a combination of character strings consecutive in the vertical direction, acquiring, from a design document including the combined character string corresponding to the first label item, information that appears consecutively on the right of the combined character string in the design document, as the information peculiar to the first label item.

2. The recording medium according to claim 1, wherein the appearance frequency information includes an appearance frequency of each of the character strings in each of the plurality of design documents and a ratio of design documents including the character string among the plurality of design documents, and
   the identifying includes
   calculating an evaluation value indicating how likely each of the character strings is to be universal information in the plurality of design documents based on the appearance frequency information; and
   identifying the plurality of label items based on the calculated evaluation values.

3. The recording medium according to claim 1, wherein the program causes the computer to execute a process comprising:
   acquiring information peculiar to a first label item among the plurality of label items from each design document including a character string corresponding to the first label item based on an appearance position of the character string in the design document; and
   adding the acquired peculiar information to the first label item included in the generated structure information.

4. The recording medium according to claim 1, wherein the identifying includes calculating an evaluation value by adding up tf-idf values of the character string in the respective design documents based on the appearance frequency information, and identifying, as each of the plurality of label items, the character string for which the calculated evaluation value is within a predetermined range.

5. The recording medium according to claim 1, wherein the program causes the computer to execute a process comprising
   receiving a search string,
   searching for a label item corresponding to the received search string by referring to the generated structure information, and
   outputting subtree information including the searched-out label item based on the structure information.

6. The recording medium according to claim 1, wherein the program causes the computer to execute a process comprising
   receiving a source character string and a target character string,
   searching for a label item corresponding to the received source character string and a label item corresponding to the received target character string by referring to the generated structure information,
   acquiring target information including a label item immediately under the searched-out label item corresponding to the target character string from the structure information, and
   outputting the acquired target information in association with the searched-out label item corresponding to the source character string.

7. A design document management method comprising:
   acquiring, by a computer, a plurality of design documents about a system;
   identifying a plurality of label items representing elements of the system based on appearance frequency information of character strings included in the plurality of design documents acquired; and
   generating structure information in which the plurality of label items are hierarchized based on appearance positions at which the character string corresponding to each of the plurality of label items identified appears in the plurality of design documents, wherein the generating includes calculating a variation degree, which indicates a sum of a sample variance in a lateral direction and a sample variance in a vertical direction, of the appearance positions of the character string corresponding to each of the label items in the plurality of design documents based on the appearance positions of the character string in the design documents including the character string, and generating the structure information based on the calculated variation degree of the appearance positions of the character string and a positional relationship between the character strings corresponding to the respective label items in each of the design documents, wherein each of the plurality of design documents is a design document in a grid paper format, and each of the character strings included in the plurality of design documents is at least any of a character string at a cell in each of the design documents and a combined character string in which character strings at adjacent cells in each of the design documents are concatenated, wherein the design document management method further includes:

selecting a first label item corresponding to a combined character string from the plurality of label items, when the combined character string corresponding to the first label item is a combination of character strings consecutive in the lateral direction, acquiring, from a design document including the combined character string corresponding to the first label item, information that appears consecutively under the combined character string in the design document, as information peculiar to the first label item, and adding the acquired peculiar information to the first label item included in the generated structure information, wherein the acquiring the peculiar information includes when the combined character string corresponding to the first label item is a combination of character strings consecutive in the vertical direction, acquiring, from a design document including the combined character string corresponding to the first label item, information that appears consecutively on the right of the combined character string in the design document, as the information peculiar to the first label item.

8. The design document management method according to claim 7, wherein the appearance frequency information includes an appearance frequency of each of the character strings in each of the plurality of design documents and a ratio of design documents including the character string among the plurality of design documents, and the identifying includes calculating an evaluation value indicating how likely each of the character strings is to be universal information in the plurality of design documents based on the appearance frequency information; and identifying the plurality of label items based on the calculated evaluation values.

9. An information processing apparatus comprising:

a memory; and a processor coupled to the memory and configured to:

acquire a plurality of design documents about a system;

identify a plurality of label items representing elements of the system based on appearance frequency information of character strings included in the plurality of design documents acquired; and generate structure information in which the plurality of label items are hierarchized based on appearance positions at which the character string corresponding to each of the plurality of label items identified appears in the plurality of design documents, wherein a generation of the structure information includes calculating a variation degree, which indicates a sum of a sample variance in a lateral direction and a sample variance in a vertical direction, of the appearance positions of the character string corresponding to each of the label items in the plurality of design documents based on the appearance positions of the character string in the design documents including the character string, and generating the structure information based on the calculated variation degree of the appearance positions of the character string and a positional relationship between the character strings corresponding to the respective label items in each of the design documents, wherein each of the plurality of design documents is a design document in a grid paper format, and each of the character strings included in the plurality of design documents is at least any of a character string at a cell in each of the design documents and a combined character string in which character strings at adjacent cells in each of the design documents are concatenated, wherein the processor:

selects a first label item corresponding to a combined character string from the plurality of label items, when the combined character string corresponding to the first label item is a combination of character strings consecutive in the lateral direction, acquire, from a design document including the combined character string corresponding to the first label item, information that appears consecutively under the combined character string in the design document, as information peculiar to the first label item, adds the acquired peculiar information to the first label item included in the generated structure information, and when the combined character string corresponding to the first label item is a combination of character strings consecutive in the vertical direction, acquires, from a design document including the combined character string corresponding to the first label item, information that appears consecutively on the right of the combined character string in the design document, as the information peculiar to the first label item.

10. The information processing apparatus according to claim 9, wherein the appearance frequency information includes an appearance frequency of each of the character strings in each of the plurality of design documents and a ratio of design documents including the character string among the plurality of design documents, and an identification of the plurality of label items includes
calculating an evaluation value indicating how likely each of the character strings is to be universal information in the plurality of design documents based on the appearance frequency information; and
identifying the plurality of label items based on the calculated evaluation values.

\* \* \* \* \*